United States Patent
Nagasawa et al.

(10) Patent No.: US 7,780,780 B2
(45) Date of Patent: *Aug. 24, 2010

(54) ORGANIC PIGMENT FINE PARTICLES AND METHOD OF PRODUCING THE SAME

(75) Inventors: Hideharu Nagasawa, Minami-Ashigara (JP); Yuki Shimizu, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 206 days.

This patent is subject to a terminal disclaimer.

(21) Appl. No.: 11/917,069

(22) PCT Filed: Jun. 9, 2006

(86) PCT No.: PCT/JP2006/312083

§ 371 (c)(1),
(2), (4) Date: Dec. 10, 2007

(87) PCT Pub. No.: WO2006/132443

PCT Pub. Date: Dec. 14, 2006

(65) Prior Publication Data

US 2009/0025611 A1  Jan. 29, 2009

(30) Foreign Application Priority Data

Jun. 10, 2005 (JP) .............................. 2005-171379

(51) Int. Cl.
C09B 67/20 (2006.01)
C09B 67/00 (2006.01)
C09B 67/10 (2006.01)
B01F 3/00 (2006.01)
B01F 3/06 (2006.01)

(52) U.S. Cl. ...................... 106/493; 106/412; 106/413; 106/494; 106/495; 106/496; 106/497; 106/498; 239/10; 366/348

(58) Field of Classification Search ................ 106/412, 106/413, 493, 494, 495, 496, 497, 498; 239/10; 366/348

See application file for complete search history.

(56) References Cited

U.S. PATENT DOCUMENTS 3,607,336 A * 9/1971 Jaffe .......................... 106/495
6,537,364 B2 * 3/2003 Dietz et al. ................ 106/493
6,562,121 B2 * 5/2003 Nickel et al. ............... 106/493
6,835,242 B2 * 12/2004 Nickel et al. ............... 106/493
7,503,972 B2 * 3/2009 Nagasawa et al. .......... 106/493
2002/0040665 A1 4/2002 Dietz et al.
2005/0109240 A1 5/2005 Maet

FOREIGN PATENT DOCUMENTS

| EP | 1 195 413 A1 | 4/2002 |
|---|---|---|
| EP | 1516896 A1 | 3/2005 |
| JP | 2002030230 A | 1/2002 |
| JP | 2002038043 A | 2/2002 |
| JP | 2002138216 A | 5/2002 |
| JP | 2002146222 A | 5/2002 |
| JP | 2002155221 A | 5/2002 |
| JP | 2002161218 A | 6/2002 |
| JP | 2003026972 A | 1/2003 |
| JP | 2004175975 A | 6/2004 |
| JP | 2005307154 A | 11/2005 |

OTHER PUBLICATIONS

EP Communication, dated Feb. 11, 2009, issued in corresponding EP Application No. 06757372.5, 6 pages.
"The Fourth Series of Experimental Chemistry"; Chemical Society of Japan, Dec. 25, 2001, vol. 12, pp. 411-488, Maruzen Co., Ltd.
"Stabilization of Pigment Dispersion and Surface Treatment Technique/Evaluation", 2001, pp. 123-224, Technical Information Institute Co., Ltd.
Willy Herbst, et al.; Industrial Organic Pigments: Production, Properties, Applications; Apr. 2004; Wiley-VCH.
Hideharu Nagasawa, et al., Design of a Micromixer for Instant Mixing Based on the Collision of Micro Segments; Chemical, Engineering & Technology; 2005, pp. 324-330; vol. 28, No. 3; Wiley-VCH Verlag GmbH & KGaA, Weinheim.

* cited by examiner

*Primary Examiner*—Anthony J Green
(74) *Attorney, Agent, or Firm*—Sughrue Mion, PLLC

(57) ABSTRACT

According to the method of producing organic pigment fine particles of the present invention, when producing organic pigment fine particles by allowing two or more solutions at least one of which is an organic pigment solution in which an organic pigment is dissolved to flow through a microchannel, the organic pigment solution flows through the microchannel in a non-laminar state. Accordingly, the contact area of solutions per unit time can be increased and the length of diffusion mixing can be shortened, and thus instantaneous mixing of solutions becomes possible. As a result, nanometer-scale monodisperse organic pigment fine particles can be produced in a stable manner.

10 Claims, 9 Drawing Sheets

ORGANIC PIGMENT FINE PARTICLES AND METHOD OF PRODUCING THE SAME

TECHNICAL FIELD

The present invention relates to organic pigment fine particles used for coatings, printing ink, electrophotographic toner, ink for inkjet printers, color filters and the like, and a method of producing the same, particularly to a method of producing organic pigment fine particles by a build-up method. More specifically, the present invention relates to a method of producing an organic pigment fine particle dispersion by depositing organic pigment fine particles by changing the hydrogen ion exponent (pH) in the course of allowing an organic pigment solution to flow through a microchannel.

BACKGROUND ART

Pigments generally exhibit vivid color tone and high coloring power, and they are widely used in many fields. Applications of pigments include, for example, coatings, printing ink, electrophotographic toner, ink for inkjet printers and color filters, and pigments have now become an important compound indispensable in everyday life.

General properties and classification of applications of pigments are described, for example, in Non-patent Document 1. Of the aforementioned applications, ink pigments for inkjet printers and pigments for color filters require high performance and are practically particularly important.

Although dyes have been used as a coloring material for ink for inkjet printers, they have disadvantages in water resistance and light resistance. To improve such problems, pigments are now being used. Images obtained using pigment ink have a special advantage that their light resistance and water resistance are better than those of images obtained by dye ink. However, formation of uniform fine particles of pigment ink of a nanometer size which can infiltrate through spaces on the surface of paper (i.e., monodispersing) is difficult, and thus there is a problem that the pigment ink has poor adhesion to paper.

With an increase in the number of pixels in digital cameras, thinning of color filters used in CCD sensors is in demand. Organic pigments are used in such color filters, and as the thickness of the filter depends largely on the particle size of the organic pigment, there has been a need to produce monodisperse and stable fine particles of a nanometer size level.

Generally, methods of producing fine particles are roughly classified into breakdown methods in which fine particles are produced from a bulk material by pulverization or the like as described, for example, in Non-patent Document 2 and build-up methods in which fine particles are produced by particle growth in a gas phase or liquid phase. Although the method of producing fine particles by pulverization based on a breakdown method has been frequently used and is highly practical, it involves various problems such as extremely low productivity for producing particles of organic materials of a nanometer size and limitation on materials to which the method can be applied. In this situation, formation of nanometer-scale fine particles of organic materials by a build-up method is now being studied.

One of the build-up methods recently disclosed is a method for forming fine particles of an azo pigment, which is an organic pigment, using supercritical fluid or subcritical fluid (e.g., Patent Document 1). Specifically, the method comprises dissolving a pigment in supercritical fluid or subcritical fluid and allowing crystal to grow by returning the conditions of the solution to room temperature and normal pressure, thereby producing fine particles. Practicing this method involves problems that equipment capable of giving extremely high temperature and pressure near the supercritical temperature and pressure is necessary and that organic compounds are generally easily decomposed under such conditions.

The second build-up method is a method for forming fine particles using a microjet reactor, which is a micro-chemical process technology described later (e.g., Patent Documents 2, 3, and 4). The method comprises introducing a solution in which a pigment is dissolved and a medium for deposition into two opposing nozzles of a different micrometer size at high pressure (e.g., 5MPa) by a pump, vertically injecting gas (compressed air, etc) to the area where the jet streams of the two solutions collide, and discharging the pigment suspension by the gas stream (about 0.5 m$^3$/h). Of such methods, the method described in Patent Documents 2 and 4 are equivalent to the breakdown method, in which pigment particles are formed into fine particles by allowing pigment suspensions to collide with each other in a chamber. On the other hand, the method described in Patent Document 3 is a method for producing fine particles by spraying a pigment solution and a medium for deposition in a chamber and depositing, which can be regarded as a build-up method. The method is designed to produce particles in a narrow space of a micrometer scale and immediately discharge the particles to the outside of the reactor in order to prevent blocking of the reactor by the pigment fine particles. Although the method is suitable for preparing fine particles with a narrow particle size distribution, it has a problem that control of the contact time of solutions is difficult and thus fine control of the reaction is difficult.

The third build-up method is a method comprising gradually bringing a solution in which an organic pigment is dissolved into contact with an aqueous medium to deposit the pigment (so-called coprecipitation method (reprecipitation method)), one of the solutions containing a dispersant, thereby producing stable fine particles (Patent Document 5). Although particles of a nanometer size can be easily produced by this method, there may be fluctuation in particle size or needle particles tend to be formed upon scale-up. Therefore, although particles are measured to be single nanometer particles in a particle size measurement device, rather long needle particles are found when the particles are observed by a transmission electron microscope. Such particles are not suitable as fine particles for ink for inkjet printers for which spherical particles are desirable.

There are methods classified between the build-up method and the breakdown method. One of them is a method called conditioning, in which the particle size of coarse particles is made uniform by applying some energy. Recently, a method of conditioning by heat treatment of an organic pigment in a microreactor utilizing a concept of micro-chemical process technology (described later) is disclosed (Patent Document 6). By continuously introducing a suspension of liquid pigment precursor (a solution in which pigment with a wide particle size distribution is suspended) into a microreactor to perform heat-treatment, phase change of pigment crystal fine particles in the suspension occurs, and simultaneously, particles having a larger average particle size and a narrower particle size distribution than those of the precursor can be produced. The method has an advantage that particles with a narrow particle size distribution can be obtained, but has a disadvantage that although the precursor has a small particle size, the particle size consequently becomes large.

Patent Document 7 discloses a method of producing a surface-treated organic pigment by collision mixing of an organic pigment, an aqueous medium and a mixture containing rosin and/or a derivative of the organic pigment. To perform such collision mixing, however, use of an extremely high pressure of 30 to 300 Mpa is necessary, and therefore, considering energy consumption, such a method of collision mixing using a microscale reactor has problems of productivity and environmental load.

[Patent Document 1] Japanese Patent Application Laid-Open No. 2002-138216

[Patent Document 2] Japanese Patent Application Laid-Open No. 2002-146222

[Patent Document 3] Japanese Patent Application Laid-Open No. 2002-155221

[Patent Document 4] Japanese Patent Application Laid-Open No. 2002-161218

[Patent Document 5] Japanese Patent Application Laid-Open No. 2003-026972

[Patent Document 6] Japanese Patent Application Laid-Open No. 2002-030230

[Patent Document 7] Japanese Patent Application Laid-Open No. 2004-175975

[Patent Document 8] Japanese Patent Application Laid-Open No. 2002-038043

[Non-patent Document 1] "Stabilization of Pigment Dispersion and Surface Treatment Technique/Evaluation", 2001, pp. 123-224, Technical Information Institute Co., Ltd.

[Non-patent Document 2] "The Fourth Series of Experimental Chemistry" edited by the Chemical Society of Japan, vol. 12, pp. 411-488, Maruzen Co., Ltd.

[Non-patent Document 3] W. Herbst and K. Hunger, "Industrial Organic Pigments, Production, Properties, Applications, Second Completely Revised Edition", VCH A Wiley Company, 1997, pp. 595-630

[Non-patent Document 4] H. Nagasawa et. al., "Design of a New Micromixer for Instant Mixing Based on the Collision of Micro Segments", WILEY-VCH Verlag GmbH & Co., KGaA, Chem. Eng. Technol. 2005, 28. No. 3, p. 324-330

DISCLOSURE OF THE INVENTION

Problems to be Solved by the Invention

Recently, owing to the ability to perform efficient chemical reactions, techniques for performing chemical reactions using a reaction channel having a small channel cross sectional area, which is the so-called "micro-chemical process technology," have been attracting attention. The micro-chemical process technology refers to a technique of production and chemical analysis of materials, utilizing chemical and/or physical phenomena occurring in a microchannel having a width of several μm to several hundred μm formed on a solid substrate by microfabrication techniques.

For example, Patent Document 2 describes a method for producing a disazo condensation pigment generally produced by the method of Non-patent Document 3 in a microreactor based on the micro-chemical process technology. Further, Patent Document 9 describes a method for producing a diketopyrrolopyrrole pigment utilizing the micro-chemical process technology. These methods can be regarded as build-up methods.

In Patent Document 8, the step of synthesizing a disazo pigment is performed in a microreactor. Since starting compounds have low solubility, the compounds are introduced into the microreactor in the form of a suspension. In that case, if condition control is wrong, possibility of blocking of channels becomes high. Thus, pigment fine particles excellent in monodispersibility cannot be produced in a stable manner, and there are problems in reproducibility and continuous production.

As described above, for producing organic pigment fine particles excellent in monodispersibility, especially for producing nanometer-scale monodisperse pigment fine particles in a stable manner, such particles cannot be produced by simply utilizing the micro-chemical process technology, and further improvement in the production technique is required.

The present invention has been made in view of such circumstances, and aims at providing a method of producing organic pigment fine particles which is capable of producing nanometer-scale monodisperse organic pigment fine particles in a stable manner, flexibly adaptable to treatment conditions (e.g., different flow ratios of reaction solutions to be mixed) and capable of processing in a large production amount. The present invention also provides organic pigment fine particles produced by the method.

Means for Solving the Problems

To achieve the aforementioned object, a first aspect of the present invention provides a method of producing organic pigment fine particles comprising: allowing two or more solutions at least one of which is an organic pigment solution in which an organic pigment is dissolved to flow through a microchannel in a non-laminar state; and depositing organic pigment fine particles from the organic pigment solution in a course of flowing.

According to the first aspect of the present invention, an organic pigment solution is allowed to flow through a microchannel in a non-laminar state when producing organic pigment fine particles by allowing two or more solutions at least one of which is an organic pigment solution in which an organic pigment is dissolved to flow through the microchannel. Accordingly, the contact area of solutions per unit time can be increased and the length of diffusion mixing can be shortened, and thus instantaneous mixing of solutions becomes possible. As a result, nanometer-scale monodisperse organic pigment fine particles can be produced in a stable manner.

The term "non-laminar flow" in the present invention means a flow with regular or irregular fluctuation, including laminar vortices represented by Karman's vortices and Taylor vortices, and turbulent flows. The details of the flow are described later.

A second aspect of the present invention has a feature that, in the first aspect, the organic pigment solution is a solution in which an organic pigment is dissolved in an alkaline or acidic aqueous medium, and the organic pigment fine particles are deposited by changing a hydrogen ion exponent (pH) of the organic pigment solution in the course of flowing through the microchannel.

The second aspect defines a preferred method for depositing organic pigment fine particles from an organic pigment solution in a microchannel. Organic pigment fine particles are deposited by changing the hydrogen ion exponent (pH) of an alkaline or acidic organic pigment solution (bringing the pH to a neutral level). In this case as well, the pH of the organic pigment solution can be instantly brought to the intended pH by making the flow of the solution in the microchannel non-laminar. Therefore, nanometer-scale monodisperse organic pigment fine particles can be produced in a stable manner.

To achieve the aforementioned object, a third aspect of the present invention provides a method of producing organic pigment fine particles including allowing two or more solutions at least one of which is an organic pigment solution in which an organic pigment is dissolved to flow through a microchannel, and depositing organic pigment fine particles from the organic pigment solution in the course of flowing, the method comprising: the step of dividing at least one solution of two or more solutions comprising the organic pigment solution in which an organic pigment is dissolved in an alkaline or acidic aqueous medium and a pH adjustor solution for changing a hydrogen ion exponent (pH) of the organic pigment solution into a plurality of solutions; the step of combining solutions so that a central axis of at least one divided solution of the plural divided solutions and a central axis of another solution of the two or more solutions different from the one divided solution intersect at one point in a combining region; and the step of depositing the organic pigment fine particles by changing the hydrogen ion exponent (pH) of the organic pigment solution by the pH adjustor solution in the course of allowing the combined solutions to flow through the microchannel.

According to the third aspect of the present invention, at least one solution of two or more solutions comprising an organic pigment solution and a pH adjustor solution is divided into a plurality of solutions, and solutions are combined so that the central axis of at least one divided solution of the plural divided solutions and the central axis of another solution of the two or more solutions different from the one divided solution intersect at one point in a combining region.

Herein, the central axis of a solution refers to, for example, the center line of a cylinder in the axial direction when a solution flows through a channel cylindrically. When a solution indicates a central axis in a channel, an axis along the length direction of the channel passing through the center of the gravity of a cross section perpendicular to the length direction of the channel (geometric center of the gravity) corresponds to the central axis.

Generally, a reaction between two or more solutions in a microchannel is basically caused by mixing by molecular diffusion. Given this, to achieve instantaneous mixing by molecular diffusion, solutions should be mixed so that the contact area of two or more solutions per unit time is increased. Further, when two or more solutions are allowed to react, their supply flow rates into a microchannel are generally different. If these two or more solutions having a different supply flow rate are directly supplied to a microchannel, their flow in the microchannel becomes unstable, making the reaction unstable.

In the present invention, to solve the above problem, at least one solution is divided into a plurality of solutions before two or more solutions are combined, and all solutions including the plural divided solutions are combined in the combining step so that the central axes of the solutions intersect at a pre-determined intersection angle in the combining region. Due to the combining of divided flows and contraction caused by the change of direction of each solution flow upon combining, the contact area of solutions per unit time can be increased and the length of diffusion mixing can be shortened, and thus instantaneous mixing of solutions can be achieved. Accordingly, by this instantaneous mixing, the pH of the organic pigment solution can be instantly brought to the intended pH in the microchannel, and therefore nanometer-scale monodisperse organic pigment fine particles can be produced in a stable manner.

Further, by dividing a solution, solutions can be instantly mixed even if a microchannel having a relatively large characteristic size is used, and therefore nanometer-scale pigment fine particles excellent in monodispersibility can be processed in a large production amount. Moreover, by using a microchannel having a relatively large characteristic size, operation with low pressure loss becomes possible, and so energy-saving and eco-friendly operation can be performed.

A fourth aspect has a feature that, in the third aspect, the two or more solutions are allowed to flow through the microchannel in a non-laminar state.

When each solution has a high flow rate particularly upon combining in the third aspect, those flows have high kinetic energy. As a result, a significant contraction is generated by the change of direction of the flows, and at the same time, a convection cell is formed, in other words, non-laminar flows are generated. This facilitates increase in the contact area and shortening of the length of diffusion mixing of two or more solutions, and enables further improved instantaneous mixing.

A fifth aspect has a feature that, in any one of the first to fourth aspects, the microchannel has a characteristic length in an equivalent diameter of 1 µm to 1000 µm.

The fifth aspect defines a preferred channel diameter of the microchannel for practicing the present invention. The channel diameter is defined as above because a microchannel having an equivalent diameter of 1 µm or less is difficult to produce, and because an equivalent diameter greater than 1000 µm increases the thickness of solution flow and instantaneous mixing becomes difficult. The microchannel has a channel diameter of more preferably 5 µm to 800 µm, particularly preferably 10 µm to 500 µm in an equivalent diameter.

A sixth aspect has a feature that, in any one of the first to fifth aspects, a shear rate (1/second) represented by U/R is changed, wherein the equivalent diameter of the microchannel is described as R(m) and a mean velocity of a solution flowing through the microchannel is described as U (m/second).

The sixth aspect describes a non-laminar flow with a shear rate (U/R) (1/second) as an index. By changing the shear rate (U/R) (1/second), mixing ability can be modified, and consequently the particle size of organic pigment fine particles to be produced can be changed although the change also depends on the deposition rate of organic pigment fine particles.

A seventh aspect has a feature that, in the sixth aspect, the shear rate (U/R) is adjusted to 100 (1/second) or more. This is because when the shear rate (U/R) is adjusted to 100 (1/second) or more, instantaneous mixing is possible.

An eighth aspect has a feature that, in any one of the third to seventh aspects, an intersection angle of the central axes upon combining the solutions is determined in the step of combining so that S1>S2 is satisfied, wherein a sum of the cross sectional areas in the thickness direction of all of the combined solutions is described as S1 and the cross sectional area of the microchannel in the radial direction is described as S2, thereby contracting the flow of the solutions at the combining region.

By setting an appropriate intersection angle of central axes upon combining solutions and contracting the flow of solutions in the combining region, the contact area of solutions can be further increased and the length of diffusion mixing can be further shortened, making instantaneous mixing easier. The intersection angle can be determined by changing the intersection angle between central axes of supply channels of each solution combined at the combining region.

A ninth aspect has a feature that, in any one of the third to eighth aspects, a time of mixing the solutions from being combined at the combining region and discharged through the microchannel is 1 microsecond to 1000 milliseconds.

The ninth aspect defines a preferred time for instantaneous mixing for producing nanometer-scale monodisperse pigment fine particles in a stable manner. The mixing time before being discharged through the microchannel is preferably 1 microsecond to 1000 milliseconds, more preferably 10 microseconds to 500 milliseconds.

A tenth aspect has a feature that, in any one of the second to ninth aspects, the organic pigment solution is alkaline. Whether the organic pigment solution is acidic or alkaline is determined based on whether the organic pigment is homogeneously mixed under an acidic condition or under an alkaline condition. Alkaline solutions are used because pigments suitable for pigment ink such as quinacridone, diketopyrrolopyrrole and disazo condensation pigments are homogeneously dissolved in alkali.

An eleventh aspect has a feature that, in any one of the first to tenth aspects, the organic pigment solution is a homogeneous solution in which an organic pigment is dissolved in an aqueous organic solvent. This is because blocking of microchannels can be prevented by using a homogeneous solution in which an organic pigment is dissolved in a homogeneous mixed solvent of water and an organic solvent.

A twelfth aspect has a feature that, in any one of the first to eleventh aspects, the organic pigment solution contains a dispersant. This is because such a dispersant immediately adsorbs deposited organic pigment fine particles and prevents the organic pigment fine particles from coagulating.

A thirteenth aspect has a feature that, in the twelfth aspect, at least one dispersant is a low molecular weight dispersant. This is because, while such dispersants generally include low molecular weight or high molecular weight dispersants such as anionic dispersants, cationic dispersants, amphoteric dispersants and pigment dispersants, low molecular weight dispersants prevent coagulation of organic pigment fine particles more effectively.

A fourteenth aspect has a feature that, in any one of the first to thirteenth aspects, the organic pigment fine particles are obtained as a dispersion thereof.

To achieve the aforementioned object, a fifteenth aspect of the present invention provides organic pigment fine particles produced by the method according any one of the first to fourteenth aspects, having a mode diameter of 1 µm or less.

By the method of the present invention, organic pigment fine particles having a mode diameter of 1 µm or less can be produced. The organic pigment fine particles are particularly excellent for ink for inkjet printers.

ADVANTAGES OF THE INVENTION

As described above, according to the present invention, nanometer-scale organic pigment fine particles excellent in monodispersibility can be produced in a stable manner. In addition, the present invention is flexibly adaptable to treatment conditions (e.g., different flow ratios of reaction solutions to be mixed) and capable of processing in a large production amount.

DESCRIPTION OF SYMBOLS

Figure 1:
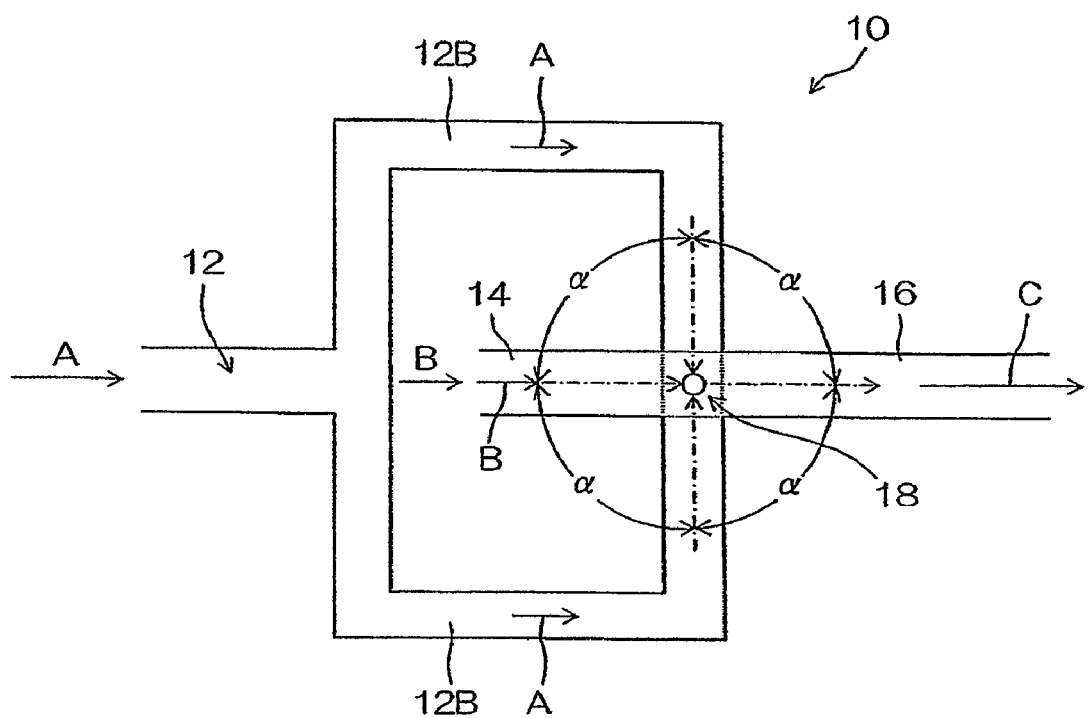
FIG. 1 is a schematic view of a flat microreactor to which the method of producing organic pigment fine particles of the present invention is applied.

10, 30 ... microreactor
12, 14 ... supply channel of solution
12A ... divided supply channel
16 ... microchannel
18 ... combining region
32 ... supply block
34 ... combining block
36 ... reaction block
38 ... outer annular groove
40 ... inner annular groove
42, 44 ... through hole in supply block
46 ... combining hole (combining region 18)
48 ... long radial groove
50 ... short radial groove
52, 54 ... through hole in combining block
58 ... through hole in reaction block (microchannel 16)

BEST MODE FOR CARRYING OUT THE INVENTION

In the following, preferred embodiments of organic pigment fine particles and a method of producing the same of the present invention are described in detail with reference to the attached figures.

The method of producing organic pigment fine particles of the present invention comprises allowing two or more solutions at least one of which is an organic pigment solution in which an organic pigment is dissolved to flow through a microchannel in a non-laminar state, and depositing organic pigment fine particles from the organic pigment solution in the course of flowing. By forming such a non-laminar flow in the microchannel, mixing of solutions is facilitated and thus instantaneous mixing becomes possible, thereby producing nanometer-scale organic pigment fine particles excellent in monodispersibility in a stable manner.

The term "non-laminar flow" in the present invention means a flow with regular or irregular fluctuation. Generally, when the first viscous fluid (e.g., water) is allowed to flow through a microchannel and a tube narrower than the microchannel is inserted thereto on the central axis and the second viscous fluid (e.g., colored liquid) is injected thereto, the colored liquid forms a linear stream without fluctuation and flows in the direction parallel to the channel axis in a stable state when the flow rate is sufficiently low. With gradual increase in the flow rate, the flow becomes unstable and is transformed into a flow with fluctuation. Due to turbulence caused by such fluctuation, the second viscous fluid is gradually mixed with the first viscous fluid. Types of fluctuation include regular fluctuation and irregular fluctuation, and the present invention encompasses both types.

Flows with regular fluctuation include, for example, flows generated when a columnar object is moved in fluid at an appropriate rate, in which opposite vortices (Karman's vortex) are created alternately on both the right and left sides of the object in the wake flow of the object under a certain flow condition to form two regular lines; and flows in which a secondary rotating flow (Taylor vortex) is generated by rotation of an inner cylinder with fluid in the circular part of a coaxial double pipe. On the other hand, flows with irregular fluctuation include so-called turbulent flow in which vortices of various sizes are randomly repeatedly formed and broken.

There are various possible factors that produce such regular or irregular fluctuation, such as structures in channels, movement or vibration of walls, external force such as electromagnetic force, and pulsation and kinetic energy of fluid itself. Formation of such a non-laminar flow is effective for mixing two or more kinds of fluids rapidly and completely. In general, complete mixing refers to a state in which molecules constituting two or more fluids are homogeneously mixed. At final stages, they are mixed by molecular diffusion (homogenization). Thus, the key is to increase the contact area of two or more fluids, which is an important parameter for molecular diffusion, in a shorter time. Generally, when viscous fluid flows through a microchannel, viscous force has a greater effect on the fluid than inertial force, and therefore such increase in the contact area is difficult. However, by utilizing the external or internal force described above to generate flow (convective flow) with regular fluctuation or irregular fluctuation, which is a so-called non-laminar flow, the contact area per unit time is accordingly increased, and rapid complete mixing becomes possible.

REFERENCES

1) Kagaku Kogaku Binran 6th ed., The Society of Chemical Engineers, Japan, Maruzen Co., Ltd.

2) Rikagaku Jiten 5th ed., Iwanami Shoten Publishers

3) M. Engler et al., "Effective Mixing by the Use of Convective Micro Mixers", Conference Proceedings, 2005 Spring National Meeting, AIChE, 128d An example of a microreactor for practicing the method of producing organic pigment fine particles of the present invention is now described. The present invention, however, is not limited thereto, and any reactor can be used as long as it is capable of creating a non-laminar flow in a microchannel. Further, solutions for producing organic pigment fine particles are described below with an example of an organic pigment solution B and a pH adjustor solution A for changing the pH of the organic pigment solution B.

FIG. 1 illustrates a flat microreactor to which the method of producing organic pigment fine particles of the present invention is applied.

As shown in FIG. 1, a microreactor 10 is designed so that two divided supply channels 12A, 12B branched in the middle of a supply channel 12 for supplying a pH adjustor solution A capable of bisecting the solution A, an undivided supply channel 14 for supplying an organic pigment solution B, and a microchannel 16 in which the pH adjustor solution A and the organic pigment solution B are allowed to react are communicated at one combining region 18. The divided supply channels 12A, 12B, the supply channel 14 and the microchannel 16 are positioned on substantially the same plane at regular intervals of 90° surrounding the combining region 18. Specifically, the central axis (dashed line) of each channel 12A, 12B, 14, 16 intersects crosswise (intersection angle α=90°) at the combining region 18. Although only the supply channel 12 of the pH adjustor solution A whose supply amount is larger than that of the organic pigment solution B is divided in FIG. 1, the supply channel 14 of the organic pigment solution B may also be divided into several channels. The intersection angle α of each channel 12A, 12B, 14, 16 disposed around the combining region 18 is not limited to 90° and can be accordingly determined. The number of division of supply channels 12, 14 is not particularly limited, but since the microreactor 10 has a complicated structure when the number is too large, the division number is preferably 2 to 10, more preferably 2 to 5.

Figure 2:
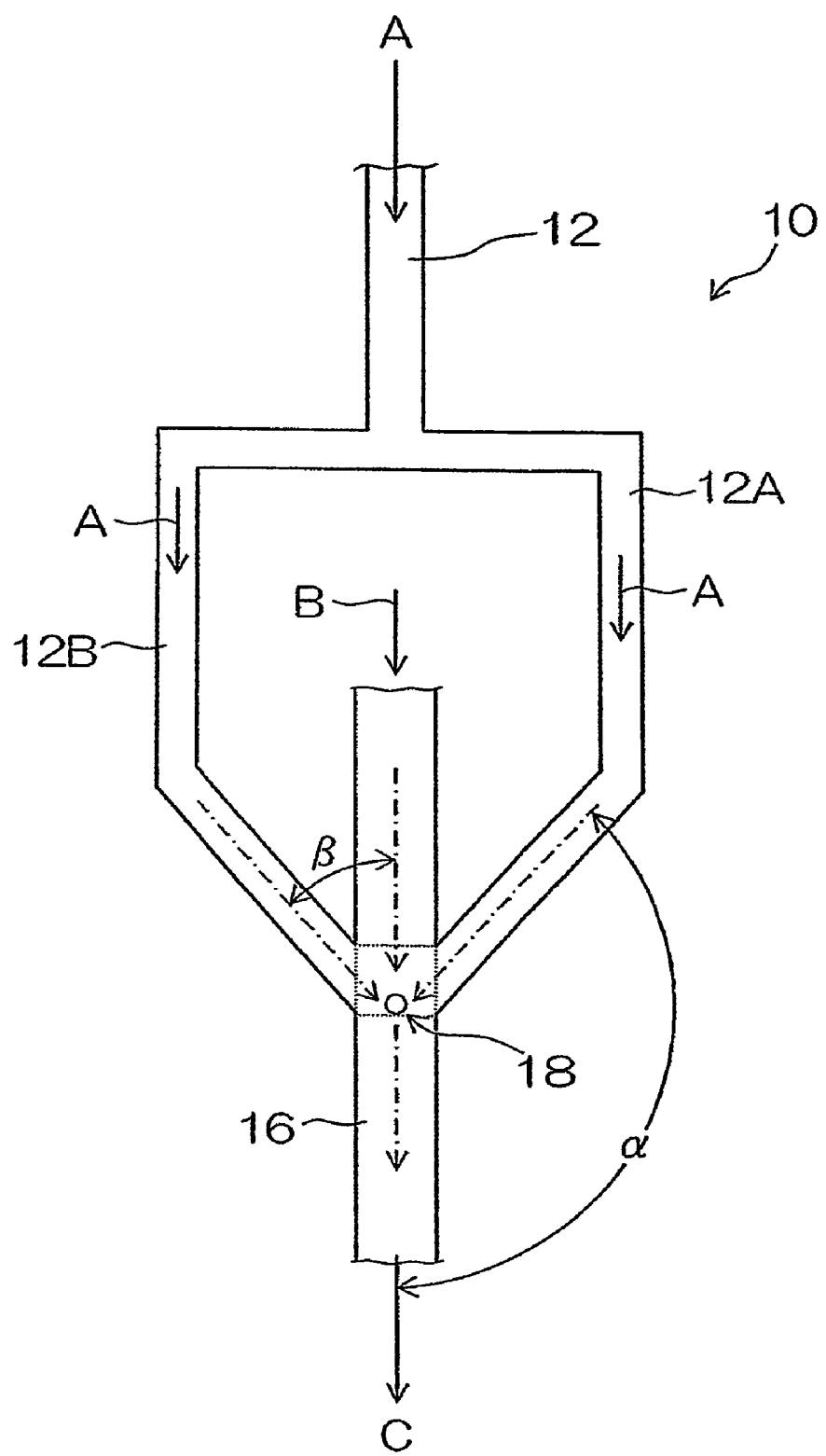
FIG. 2 is a schematic view illustrating a modified example of a flat microreactor to which the method of producing organic pigment fine particles of the present invention is applied.

FIG. 2 illustrates a modification of the flat microreactor 10 in FIG. 1. The intersection angle β between the central axis of the supply channel 14 and the central axis of divided supply channels 12A, 12B is set to 45°, which is smaller than 90° in FIG. 1. The intersection angle α between the central axis of the divided supply channels 12A, 12B and the central axis of the microchannel 16 is set to 135°.

Figure 3:
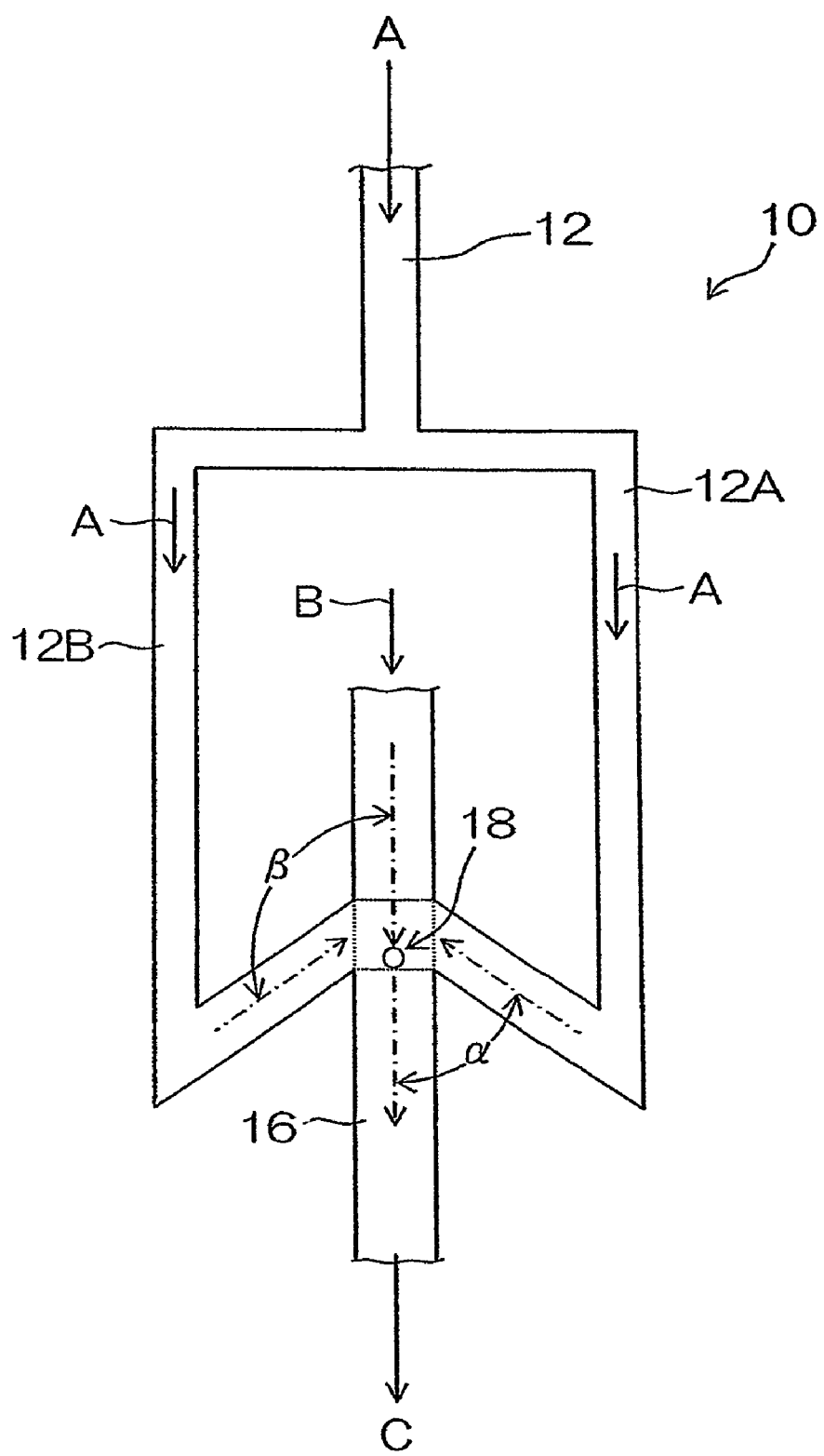
FIG. 3 is a schematic view illustrating another modified example of a flat microreactor to which the method of producing organic pigment fine particles of the present invention is applied.

FIG. 3 illustrates another modification of the flat microreactor 10 in FIG. 1. The intersection angle β between the central axis of the supply channel 14 through which the organic pigment solution B flows and the central axis of the divided supply channels 12A, 12B through which the pH adjustor solution A flows is set to 135°, which is larger than 90° in FIG. 1. The intersection angle α between the central axis of the divided supply channels 12A, 12B and the central axis of the microchannel 16 is set to 45°. While the intersection angles α, β relative to the supply channel 14, divided supply channels 12A, 12B and the microchannel 16 can be accordingly determined, the angles α, β are preferably determined so that S1>S2 is satisfied, wherein the sum of the cross sectional areas in the thickness direction of all of the combined solutions of the organic pigment solution B and the pH adjustor solution A is described as S1 and the cross sectional area of the microchannel 16 in the radial direction is described as S2. This is because, with this setting, the contact area of the solutions A, B can be further increased and the length of diffusion mixing can be further shortened, and instantaneous mixing occurs more easily.

Figure 4:
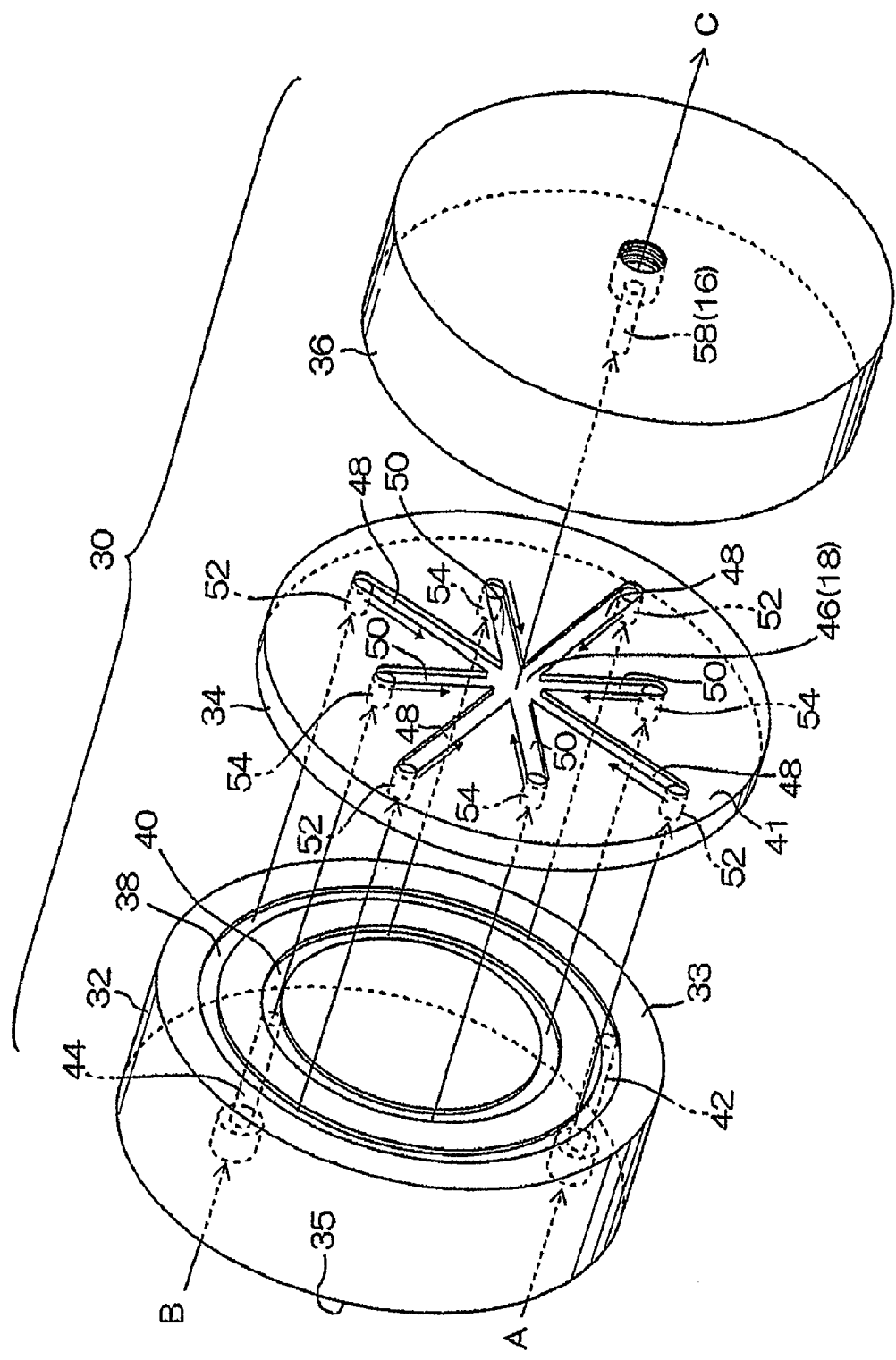
FIG. 4 is a schematic view of a three-dimensional microreactor to which the method of producing organic pigment fine particles of the present invention is applied.

FIG. 4 illustrates an example of a three-dimensional microreactor 30 to which the method of producing organic pigment fine particles of the present invention is applied, which is an exploded perspective view illustrating a three disassembled parts constituting the microreactor 30. Parts having the same function as those in FIG. 1 to FIG. 3 are described with the same symbols.

The three-dimensional microreactor 30 is composed of a supply block 32, a combining block 34 and a reaction block 36 which are cylindrical, as main components. The microreactor 30 is assembled by aligning the sides of these cylindrical blocks 32, 34, 36 in that order to form a cylinder, and the blocks 32, 34, 36 are integrally fastened using bolts and nuts.

Two annular grooves 38, 40 are concentrically formed on the side face 33 of the supply block 32 facing against the combining block 34. When the microreactor 30 is assembled, two annular grooves 38, 40 each constitute a ring channel through which the organic pigment solution B and the pH adjustor solution A flow. Through holes 42, 44 are each formed so as to reach the outer annular groove 38 and the inner annular groove 40 from the opposite side face 35 of the supply block 32 which does not face the combining block 34. Of the two through holes 42, 44, to the through hole 42 communicated to the outer annular groove 38 is connected a supply means (a pump, connecting tube, etc.) for supplying the pH adjustor solution A. A supply means for supplying the organic pigment solution B is connected to the through hole 44 communicated to the inner annular groove 40. While the microreactor 30 is configured so that the pH adjustor solution A flows through the outer annular groove 38 and the organic pigment solution B flows through the inner annular groove 40 in FIG. 4, an opposite configuration is also possible.

A circular combining hole 46 is formed at the center of the side face 41 of the combining block 34 facing the reaction block 36. Four long radial grooves 48, 48 . . . and four short radial grooves 50, 50 . . . are formed alternately and radially from the combining hole 46. The combining hole 46 and the radial grooves 48, 50 constitute a circular space which is the combining region 18 and radial channels through which the solutions A, B flow when the microreactor 30 is assembled. Further, through holes 52, 52 . . . are formed at the end of the long radial grooves 48 of the 8 radial grooves 48, 50 in the thickness direction of the combining block 34. These through holes 52 are communicated to the aforementioned outer annular groove 38 formed on the supply block 32. Likewise, through holes 54, 54 . . . are formed at the end of the short radial grooves 50 in the thickness direction of the combining block 34. These through holes 54 are communicated to the inner annular groove 40 formed on the supply block 32.

A through hole 58 communicated to the combining hole 46 is formed at the center of the reaction block 36 in the thickness direction. The through hole 58 corresponds to the microchannel 16.

With these arrangements, the pH adjustor solution A flows through the supply channel 12 composed of the through hole 42 of the supply block 33→the outer annular groove 38→the through holes 52 of the combining block 34→the long radial groove 48 to be divided in 4 divided flows, and the flows reach the combining region 18 (combining hole 46). On the other hand, the organic pigment solution B flows through the supply channel 14 composed of the through hole 44 of the supply block 32→the inner annular groove 40→the through holes 54 of the combining block 34→the short radial grooves 50 to be divided in 4 divided flows, and the flows reach the combining region 18 (combining hole 46). After the divided flows of the pH adjustor solution A and the divided flows of the organic pigment solution B are combined at the combining region 18 with maintaining their kinetic energy, they turn 90° around and flow into the microchannel 16.

Figure 5A:
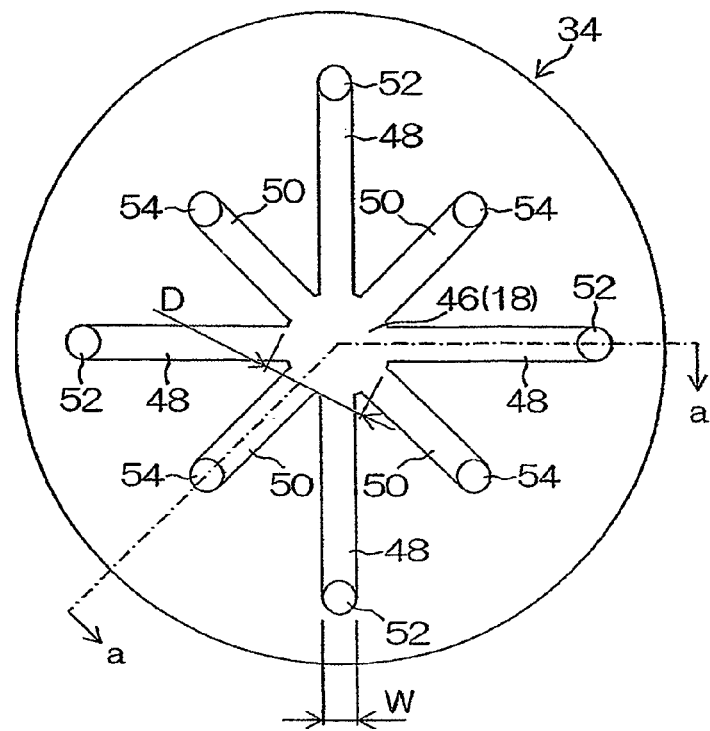
FIG. 5A is a plan view of a three-dimensional microreactor.
Figure 5B:
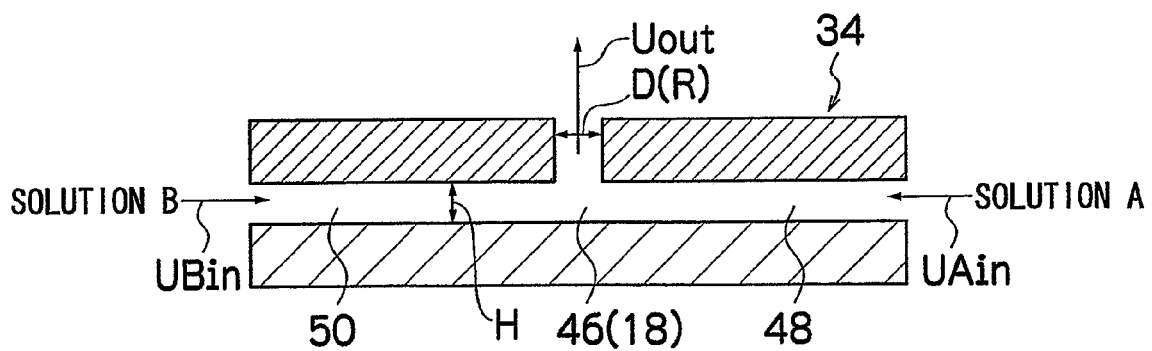
FIG. 5B is a cross-sectional view taken on line a-a in FIG. 5A.

FIG. 5A is a plan view illustrating the combining block 34 and FIG. 5B is a cross sectional view taken on line a-a in FIG. 5A. In FIG. 5A and FIG. 5B, W represents the width of the divided supply channels 12, 14, H represents the depth of the divided supply channels 12, 14, D represents the diameter of the combining region 18, and R represents the diameter of the microchannel 16. Generally, the diameter of the combining region 18 is the same as the diameter of the microchannel 16. UAin represents the mean velocity of the pH adjustor solutions A entering into the combining region 18 flowing through the divided supply channels 12, and UBin is the mean velocity of the organic pigment solutions B entering into the combining region 18 flowing through the divided supply channels 14. Uout is the mean velocity of the combined solution A, B discharged from the combining region 18 to the microchannel 16.

Preferably, the microchannel 16 is a channel having a length which primarily determines flowing characteristics of fluid flowing through the channel 16, i.e., a characteristic length, of 1 μm to 1000 μm, preferably 5 μm to 800 μm, more preferably 10 μm to 500 μm in an equivalent diameter. However, when the flow rate is high and the number of division is large, the channel may have a characteristic length of 1000 μm or more because the contact area of solutions can be increased and the length of diffusion mixing can be shortened. The equivalent diameter herein described is also called a corresponding diameter, which is a term used in the field of mechanical engineering. When assuming a round tube equivalent to a tube (channel in the present invention) of any cross section, the diameter of the equivalent round tube is referred to as an equivalent diameter.

The equivalent diameter (deq) is defined as deq=4A/p using A: cross sectional area of a tube and p: wetted perimeter of the tube (peripheral length). When applied to a round tube, the equivalent diameter corresponds to the diameter of the round tube. The equivalent diameter is used for estimating flowing or heat transfer characteristics of a tube based on the data of an equivalent round tube and indicates a spatial scale (characteristic length) of a phenomenon. The equivalent diameter of a square pipe a on a side is deq=4a2/4a=a. The equivalent diameter of an equilateral triangle a on a side is deq=a/√3. In the case of a flow between parallel plates with a channel height of h, the equivalent diameter is deq=2h (see, for example, "Encyclopedia of Mechanical Engineering", The Japan Society of Mechanical Engineers, 1997, Maruzen Co., Ltd.).

The microreactors 10, 30 in FIG. 1 to FIG. 4 configured as above can be manufactured by using processing techniques for precision machines such as semiconductor processing techniques, especially etching (e.g., photolithographic etching), ultrafine electric discharge machining, stereo lithography, mirror finishing technique and diffused bonding. In addition, general machining techniques using a lathe or a drilling machine may be used.

Materials for the microreactors 10, 30 are not particularly limited as long as the above-described processing techniques can be applied. Specifically, metal materials (metal such as iron, aluminum, stainless steel, titanium), resin materials (fluorine resin, acrylic resin, etc.) and glass (silicon, quartz, etc.) may be used.

The supply means for supplying an organic pigment solution B and a pH adjustor solution A to the microreactors 10, 30 requires a fluid control function for controlling the flow of solutions. Since the behavior of fluid in the microchannel 16 has characteristics different from those in a macroscale process, a control system appropriate for a microscale process is necessary. The fluid control system is classified into a continuous flow system and a liquid droplet (liquid plug) system based on the formation, and an electric driving system and a pressure driving system based on the driving force.

Of these systems, continuous flow systems are most widely used. In fluid control on the continuous flow system, generally the microchannel 16 is completely filled with fluid and the whole fluid is driven by a pressure source such as a syringe pump provided outside. Although having a disadvantage of a large dead volume, the continuous flow system has a great advantage that the control system works with a relatively simple set-up.

A system different from the continuous flow system is a liquid droplet (liquid plug) system. In the system, droplets separated by air are allowed to move inside a reactor or a channel leading to the reactor. The individual droplets are driven by the air pressure. In this process, a vent structure for discharging air between droplets and a channel wall or between droplets to the outside according to need, and a valve structure for keeping the pressure inside the branched channel independent of the pressure in other areas needs to be provided in the reactor system. In addition, since operation of droplets is performed by controlling pressure difference, a pressure control system composed of a pressure source and a switching valve must be constructed outside the reactor. Although the liquid droplet system involves rather complicated configuration and structure of the reactor as described above, since multi-stage operation such as individually treating plural portions of droplets and sequentially performing several reactions can be done, the degree of freedom in the system configuration is high.

For the driving system for performing fluid control, an electric driving system in which fluid is moved by an electroosmotic flow generated by applying high voltage to both ends of the microchannel 16, and a pressure driving system in which fluid is moved by applying pressure using an external pressure source are generally widely used. A known difference of the two is that, in terms of the behavior of fluid, while the electric driving system has a flat distribution of flow rate profile in the channel cross section, the pressure driving system has a hyperbolic distribution in which the flow rate is high at the center of the channel and low at the wall. For transporting fluid while maintaining the shape of sample plugs, an electric driving system is better suited. The electric driving system inevitably involves a continuous flow system because the channel needs to be filled with fluid. However, since operation of fluid can be performed by electric control, the system allows a rather complicated process such as creating temporal concentration gradient by continuously changing the mixing ratio of two solutions. On the other hand, in the case of pressure driving systems, because control can be done irrespective of electric properties of fluid and secondary effects such as heat generation or electrolysis may not be considered, the substrate is substantially not affected and the system has wide application. However, in view of the fact that an external pressure source must be provided and the response characteristic of operation varies depending on the dead volume in the pressure system, automation of complicated processes is necessary. The fluid control system used in the present invention is accordingly selected depending on the intended purpose, but a pressure driving system based on a continuous flow system is preferred.

For controlling the temperature in the microchannel 16 (reaction temperature control), the temperature may be controlled by putting the entire reactor in a temperature controlled container, or incorporating a heating structure made of metal resistance line or polysilicon into the reactor and performing a thermal cycle using the heating structure for heating while employing natural cooling for cooling. For sensing the temperature, when a metal resistance line is used, preferably another resistance line which is the same as the heater is incorporated and the temperature is detected based on the variation in the resistance values. When polysilicon is used, the temperature is preferably detected by using a thermocouple. The channel may also be heated and cooled from the outside by bringing a Peltier element into contact with the channel. Which method is used is determined depending on the purpose of use or the material of the channel body.

The number of the microreactors 10,30 used in the present invention may be one, but plural reactors may be arranged in parallel (numbering-up) to increase the throughput according to need.

The method of producing organic pigment fine particles of the present invention using the microreactor 10,30 configured as above is now described.

When producing organic pigment fine particles using the microreactor 10,30 in FIG. 1 to FIG. 4 configured as above, organic pigment fine particles are produced through 3 steps of a dividing step, a combining step and a deposition step in any one of the reactors 10,30.

In the dividing step (supply block), at least one solution of the two solutions A, B of an organic pigment solution B and a pH adjustor solution A for changing the hydrogen ion exponent of the organic pigment solution B is divided into a plurality of solutions.

In the combining step (combining block), solutions are combined so that the central axis of at least one divided solution of the plural divided solutions and the central axis of the other solution of the two solutions A, B intersect at one point in the combining region 18.

In the deposition step (reaction block, including the combining hole in the combining block in some case), organic pigment fine particles are deposited by changing the hydrogen ion exponent (pH) of the organic pigment solution B by the pH adjustor solution A in the course of allowing the combined solutions A, B to flow through the microchannel 16.

In the microreactor 10 in the FIG. 1 to FIG. 3, the organic pigment solution B is divided into two and the pH adjustor solution A is not divided. In the microreactor 30 in FIG. 4, the organic pigment solution B and the pH adjustor solution A are each divided into four. Comparing the organic pigment solution B and the pH adjustor solution A used for producing organic pigment fine particles, the amount of the pH adjustor solution A is larger, and so the pH adjustor solution A is preferably divided.

As described above, at least one solution is divided into a plurality of solutions before the organic pigment solution B and the pH adjustor solution A are combined, and all solutions including the divided solutions are combined at the combining region 18. Then, the direction of the combined solutions A, B is changed at a pre-determined angle and the solutions are allowed to flow through the microchannel 16. As a result, contraction is generated by the kinetic energy and the change of direction of the flow of the combined solutions A, B. Due to increase in the contact area of the solutions A, B and shortening of the length of diffusion mixing, instantaneous mixing can be achieved, and the pH of the organic pigment solution B can be instantly brought to the intended pH in the microchannel 16. Accordingly, nanometer-scale monodisperse organic pigment fine particles can be produced in a stable manner.

Herein, mixing generally means homogenization of powdery particles, powdery particles and fluid (liquid, gas) or fluid, which contain two or more components. In particular, fluid containing two or more components is desirably homogeneous at a molecular level. Since mixing in the microchannel 16 occurs basically due to molecular diffusion, to complete mixing promptly, the key is to increase the contact area of two or more fluids per unit time. As for the time of instantaneous mixing, the time from combining solutions at the combining region to discharging them through the microchannel 16 is preferably 1 microsecond to 1000 milliseconds, more preferably 10 microseconds to 500 milliseconds.

The method for evaluating mixing of miscible liquids is described, for example, in Non-patent Document, S. Pani?, et. al, "Experimental approaches to a better understanding of mixing performance of microfluidic devices", Chem. Eng. J. 101, 2004, p. 409-p. 419. The mixing time can be calculated from values obtained by dividing the volume (mL) of a microchannel 16 in which mixing occurs by the total flow in the channel (mL/second) under conditions where mixing is considered to be completed according to the aforementioned mixing evaluation method.

Principles and methods of mixing in the microchannel 16 are described in detail, for example, in Non-patent Document V. Hessel, et. al., "Chemical Micro Process Engineering-Processing and Plant-" WILEY-VCH, 2005, p. 1-p. 280.

To form a non-laminar flow in the microchannel 16 in the production of organic pigment fine particles, the shear rate (1/second) represented by U/R in which R(m) represents the equivalent diameter of the microchannel 16 and U (m/second) represents the mean velocity of a solution flowing through the microchannel 16 is preferably set to 100 or more.

Figure 6:
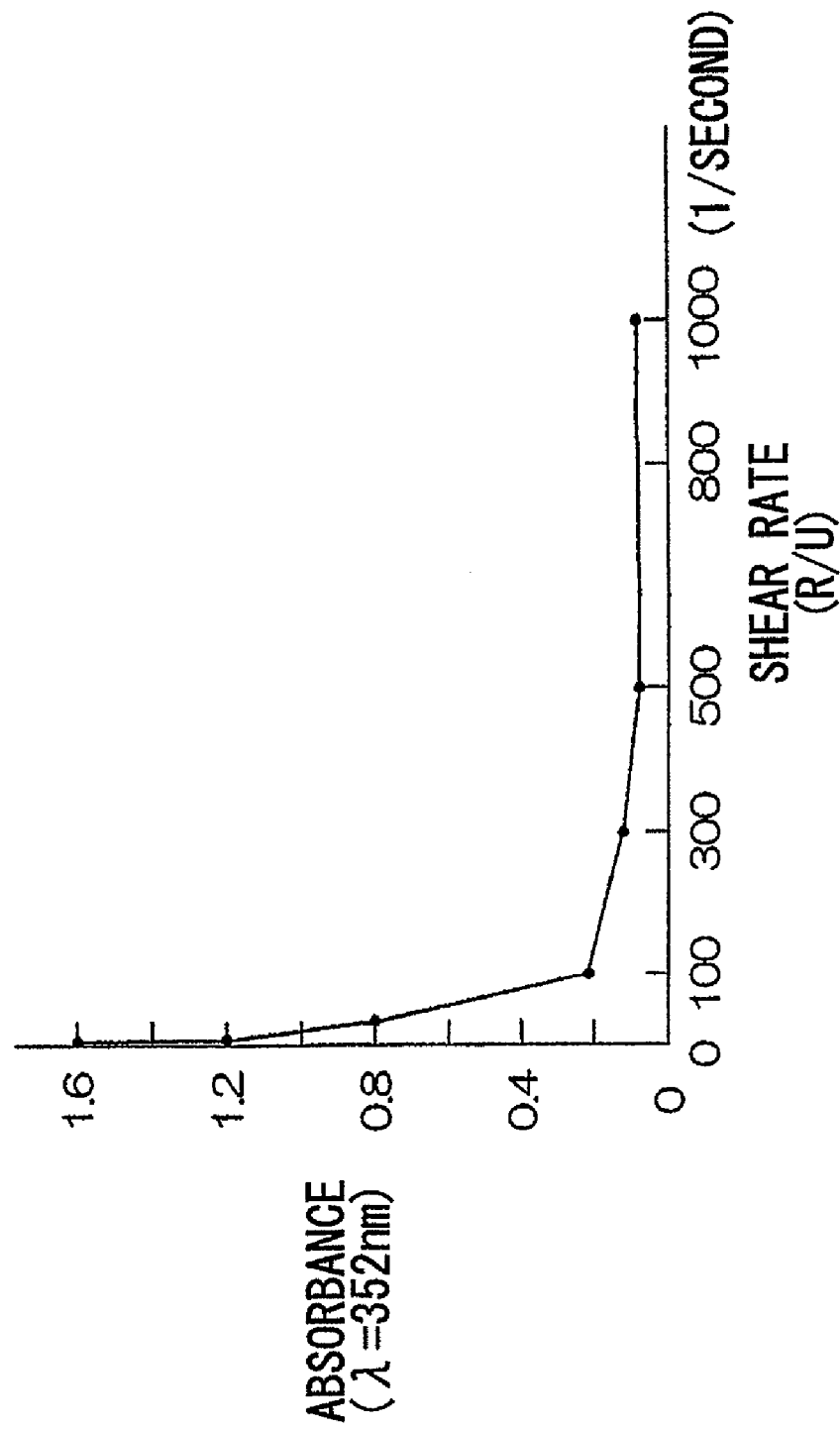
FIG. 6 is an explanatory view showing the relation between the shear rate and the mixing ability in the microchannel.

FIG. 6 shows analysis of the relation between the shear rate (U/R) and the mixing ability in the microchannel 16 described in Non-patent Document 4. The mixing ability is evaluated based on the turbidity of the solution represented by the absorbance. Specifically, the higher the absorbance, the poor the mixing ability, and the lower the absorbance, the better the mixing ability. As can be shown in FIG. 6, with increase in the shear rate (U/R) in the microchannel 16, the absorbance is rapidly decreased, and remains substantially the same at (U/R) of 100 or more. This implies that mixing different from mixing by molecular diffusion in a laminar flow, i.e., mixing by molecular diffusion in a non-laminar flow is occurring in the zone where the shear rate (U/R) is 100 or more. By designing an appropriate relation between the equivalent diameter R(m) of the microchannel 16 and the mean velocity U (m/second) of a solution flowing through the microchannel 16, the shear rate (U/R) in the microchannel 16 can be 100 or more. As a result, instantaneous mixing can be performed. Although the graph of FIG. 6 does not show detailed behavior of the mixing ability when the shear rate (U/R) is 100 or more, upon examination of particle size of organic pigment fine particles produced at a high shear rate range of about 20,000 (1/second) to 100,000 (1/second) in Example 3 described later, the higher the shear rate, the smaller the particle size even in such a high shear rate range. From this, it is considered that the higher the shear rate, the more the mixing ability is improved, even if the shear rate is higher than 100 (1/second).

To form a contraction by the change of the direction of solutions A, B at the combining region 18, such a construction can be formed by appropriately designing the relation between the mean velocity of the solutions A, B upon combining and the intersection angles α, β of the central axes of the solutions A, B upon combining. Further, rapid change in the direction of the solutions A, B at the combining region 18 makes it easier to form a flow with regular or irregular fluctuation. It is considered that by establishing an appropriate relation between the mean velocity of the solutions A, B flowing into the combining region 18 and the intersection angles α, β of the central axes of the solutions A, B upon combining, a non-laminar flow is easily formed in the microchannel 16.

The temperature of the solutions A, B flowing through the microchannel 16 may be within the range that the aqueous medium does not coagulate or boil, and is preferably −20° C. to 90° C., more preferably −10° C. to 50° C., particularly preferably 0 to 30° C. The flow rate of the solutions A, B flowing through the microchannel 16 is also preferably 0.1 to 5000 mL/minute, more preferably 1 to 1000 mL/minute, particularly preferably 5 to 500 mL/minute. In the present invention, the range of the concentration of substrate (organic pigment and a reactant thereof) flowing through the microchannel 16 is generally 0.5 to 20% by mass, preferably 1.0 to 10% by mass.

The hue of the organic pigment used in the present invention is not limited. A magenta pigment, a yellow pigment or a cyan pigment may be used. Specifically, a magenta pigment, a yellow pigment or a cyan pigment such as perylene, perinone, quinacridone, quinacridonquinone, anthraquinone, anthanthrone, benzimidazolone, disazo condensation, disazo, azo, indanthrone, phthalocyanine, triarylcarbonium, dioxazine, aminoanthraquinone, diketopyrrolopyrrole, thioindigo, isoindoline, isoindolinone, pyranthrone or isoviolanthrone pigment or a mixture thereof may be used. More specifically, useful are a perylene pigment such as C.I. pigment red 190 (C.I. No. 71140), C.I. pigment red 224 (C.I. No. 71127) or C.I. pigment violet 29 (C.I. No. 71129), a perinone pigment such as C.I. pigment orange 43 (C.I. No. 71105) or C.I. pigment red 194 (C.I. No. 71100), a quinacridone pigment such as C.I. pigment violet 19 (C.I. No. 73900), C.I. pigment violet 42, C.I. pigment red 122 (C.I. No. 73915), C.I. pigment red 192, C.I. pigment red 202 (C.I. No. 73907), C.I. pigment red 207 (C.I. No. 73900, 73906) or C.I. pigment red 209 (C.I. No. 73905), a quinacridonequinone pigment such as C.I. pigment red 206 (C.I. No. 73900/73920), C.I. pigment orange 48 (C.I. No. 73900/73920) or C.I. pigment orange 49 (C.I. No. 73900/73920), an anthraquinone pigment such as C.I. pigment yellow 147 (C.I. No. 60645), an anthanthrone pigment such as C.I. pigment red 168 (C.I. No. 59300), a benzimidazolone pigment such as C.I. pigment brown 25 (C.I. No. 12510), C.I. pigment violet 32 (C.I. No. 12517), C.I. pigment yellow 180 (C.I. No. 21290), C.I. pigment yellow 181 (C.I. No. 11777), C.I. pigment orange 62 (C.I. No. 11775) or C.I. pigment red 185 (C.I. No. 12516), a disazo condensation pigment such as C.I. pigment yellow 93 (C.I. No. 20710), C.I. pigment yellow 94 (C.I. No. 20038), C.I. pigment yellow 95 (C.I. No. 20034), C.I. pigment yellow 128 (C.I. No. 20037), C.I. pigment yellow 166 (C.I. No. 20035), C.I. pigment orange 34 (C.I. No. 21115), C.I. pigment orange 13 (C.I. No. 21110), C.I. pigment orange 31 (C.I. No. 20050), C.I. pigment red 144 (C.I. No. 20735), C.I. pigment red 166 (C.I. No. 20730), C.I. pigment red 220 (C.I. No. 20055), C.I. pigment red 221 (C.I. No. 20065), C.I. pigment red 242 (C.I. No. 20067), C.I. pigment red 248, C.I. pigment red 262 or C.I. pigment brown 23 (C.I. No. 20060), a disazo pigment such as C.I. pigment yellow 13 (C.I. No. 21100), C.I. pigment yellow 83 (C.I. No. 21108) or C.I. pigment yellow 188 (C.I. No. 21094), an azo pigment such as C.I. pigment red 187 (C.I. No. 12486), C.I. pigment red 170 (C.I. No. 12475), C.I. pigment yellow 74 (C.I. No. 11714), C.I. pigment red 48 (C.I. No. 15865), C.I. pigment red 53 (C.I. No. 15585), C.I. pigment orange 64 (C.I. No. 12760) or C.I. pigment red 247 (C.I. No. 15915), an indanthrone pigment such as C.I. pigment blue 60 (C.I. No. 69800), a phthalocyanine pigment such as C.I. pigment green 7 (C.I. No. 74260), C.I. pigment green 36 (C.I. No. 74265), pigment green 37 (C.I. No. 74255), pigment blue 16 (C.I. No. 74100), C.I. pigment blue 75 (C.I. No. 74160:2) or 15 (C.I. No. 74160), a triarylcarbonium pigment such as C.I. pigment blue 56 (C.I. No. 42800) or C.I. pigment blue 61 (C.I. No. 42765; 1), a dioxazine pigment such as C.I. pigment violet 23 (C.I. No. 51319) or C.I. pigment violet 37 (C.I. No. 51345), an aminoanthraquinone pigment such as C.I. pigment red 177 (C.I. No. 65300), a diketopyrrolopyrrole pigment such as C.I. pigment red 254 (C.I. No. 56110), C.I. pigment red 255 (C.I. No. 561050), C.I. pigment red 264, C.I. pigment red 272 (C.I. No. 561150), C.I. pigment orange 71 or C.I. pigment orange 73, a thioindigo pigment such as C.I. pigment red 88 (C.I. No. 73312), an isoindoline pigment such as C.I. pigment yellow 139 (C.I. No. 56298) or C.I. pigment orange 66 (C.I. No. 48210), an isoindolinone pigment such as C.I. pigment yellow 109 (C.I. No. 56284) or a C.I. pigment orange 61 (C.I. No. 11295), a pyranthrone pigment such as C.I. pigment orange 40 (C.I. No. 59700) or C.I. pigment red 216 (C.I. No. 59710), and an isoviolanthrone pigment such as C.I. pigment violet 31 (60010).

A preferred pigment is a quinacridone, diketopyrrolopyrrole, disazo condensation, azo or phthalocyanine pigment. A particularly preferred pigment is a quinacridone, disazo condensation, azo or phthalocyanine pigment.

In the present invention, two or more organic pigments, a solid solution of an organic pigment or combination of an organic pigment and an inorganic pigment may also be used. Such an organic pigment needs to be homogeneously dissolved in an alkaline or acidic aqueous medium. Whether the pigment is dissolved in an acidic medium or an alkaline medium is determined based on under which condition the pigment can be easily homogeneously dissolved. Generally, for pigments containing, in their molecule, a group which can be dissociated under an alkali condition, an alkaline aqueous medium is used. For pigments which does not contain a group which can be dissociated under an alkaline condition and contains a large number of nitrogen atoms to which proton can be easily attached, an acidic aqueous medium is used. For example, quinacridone, diketopyrrolopyrrole and disazo condensation pigments are dissolved in an alkaline aqueous medium and phthalocyanine pigments are dissolved in an acidic aqueous medium.

The base used for dissolving a pigment in an alkaline aqueous medium includes an inorganic base such as sodium hydroxide, calcium hydroxide or barium hydroxide, or an organic base such as trialkylamine, diazabicycloundecene (DBU) or metal alkoxide. Preferably, the base is an inorganic base. The amount of the base to be used is not particularly limited as long as the pigment can be homogeneously dissolved in the medium. An inorganic base is used in a proportion of preferably 1.0 to 30 molar equivalents, more preferably 2.0 to 25 molar equivalents, further preferably 3 to 20 molar equivalents based on the amount of the pigment. An organic base is used in a proportion of preferably 1.0 to 100 molar equivalents, more preferably 5.0 to 100 molar equivalents, and further preferably 20 to 100 molar equivalents based on the amount of the pigment.

The acid used for dissolving a pigment in an acidic aqueous medium includes an inorganic acid such as sulfuric acid, hydrochloric acid or phosphoric acid, or an organic acid such as acetic acid, trifluoroacetic acid, oxalic acid, methanesulfonic acid or trifluoromethanesulfonic acid. The acid is preferably an inorganic acid, particularly preferably sulfuric acid. The amount of the acid to be used is not particularly limited as long as the pigment can be homogeneously dissolved in the medium, but the acid is used in an excess amount compared to the amount of the base. Irrespective of whether it is inorganic or organic, the acid is used in a proportion of preferably 3 to 500 molar equivalents, more preferably 10 to 500 molar equivalents, further preferably 30 to 200 molar equivalents based on the amount of the pigment.

The aqueous medium is now described. The aqueous medium in the present invention is a medium in which a pigment is dissolved with an alkali or an acid, and which is soluble in water. The aqueous medium means water alone or an organic solvent soluble in water. Examples of organic solvents soluble in water include a monohydric alcohol solvent which is typically methanol, ethanol, isopropanol or t-butanol, a polyhydric alcohol solvent which is typically ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerol or trimethylolpropane, a lower monoalkyl ether solvent of polyhydric alcohol such as ethylene glycol monomethyl(or ethyl)ether, diethylene glycol monomethyl(or ethyl) ether or triethylene glycol monoethyl(or butyl)ether, a polyether solvent such as ethylene glycol dimethyl ether (monoglyme), diethylene glycol dimethyl ether (diglyme) or triethylene glycol dimethyl ether (triglyme), an amide solvent such as dimethylformamide, dimethylacetamide, 2-pyrrolidone, N-methyl-2-pyrrolidone, 1,3-dimethyl-2-imidazolidinone, urea or tetramethylurea, a sulfur-containing solvent such as sulfolane, dimethyl sulfoxide or 3-sulfolene, a polyfunctional solvent such as diacetone alcohol or diethanolamine, a carboxylic acid solvent such as acetic acid, maleic acid, docosahexaenoic acid, trichloroacetic acid or trifluoroacetic acid, and a sulfonic acid solvent such as methanesulfonic acid or trifluorosulfonic acid. These solvents may be used in a mixture of two or more. A preferred organic solvent is an amide solvent or a sulfur-containing solvent as an alkaline solvent, and a carboxylic acid solvent, a sulfur solvent or a sulfonic acid solvent as an acidic solvent. A more preferred organic solvent is a sulfur-containing solvent as an alkaline solvent and a sulfonic acid solvent as an acidic solvent. A particularly preferred solvent is dimethyl sulfoxide (DMSO) as an alkaline solvent and methanesulfonic acid as an acidic solvent.

When using a mixed solvent of water and an organic solvent as an aqueous medium, the mixing ratio of water and the organic solvent is not particularly limited as long as a pigment can be homogeneously dissolved therein. Preferably, the mixing ratio is water/organic solvent=0.05 to 10 (mass ratio) for an alkaline solvent. When the solvent is acidic and an inorganic acid is used, no organic solvent is used. Preferably, for example, sulfuric acid alone is used. When an organic acid is used, the organic acid itself acts as an organic solvent. To adjust the viscosity and the solubility, a plurality of acids may be mixed, or water may be added thereto. Preferably, the mixing ratio is water/organic solvent (organic acid)=0.005 to 0.1 (mass ratio).

In the present invention, preferably a solution in which a pigment is homogeneously dissolved is introduced into a channel. When a suspension is introduced into a channel, fine particles may have an increased particle size and a broad particle size distribution, and channels are easily blocked in some cases. The expression "homogeneously dissolved" refers to a solution which has substantially no turbidity when observed with visible light. In the present invention, a solution obtained by filtering through a micro-filter of 1 μm or less, or a solution which does not contain substances left when filtered through a micro-filter of 1 μm is defined as a "homogeneously dissolved" solution.

The hydrogen ion exponent (pH) is now described. The hydrogen ion exponent (pH) is a common logarithm of the reciprocal of hydrogen ion concentration (molar concentration), which is also referred to as hydrogen exponent. The hydrogen ion concentration means the concentration of hydrogen ions H+ in a solution, indicating the molar number of hydrogen ions present in 1 L of a solution. Since the hydrogen ion concentration fluctuates in an extremely wide range, the concentration is generally expressed by the hydrogen ion exponent (pH). For example, pure water contains $10^{-7}$ moles of hydrogen ions at 1 atm at 25° C., and so pure water has pH of 7 and is neutral. An aqueous solution with pH<7 is acidic, and an aqueous solution with pH>7 is alkaline. Methods of measuring pH include potentiometry and colorimetry.

The present invention, particularly claim 2, provides a method of producing organic pigment fine particles, comprising changing the hydrogen ion exponent (pH) in the course of flowing through the microchannel 16. The method is performed using a channel having another feed port different from a feed port of a homogeneous solution of organic pigment, for example, a channel having at least two feed ports shown in FIG. 1. Specifically, a homogeneous organic pigment solution is introduced through a feed port in FIG. 1, and neutral, acidic or alkaline water or an aqueous solution in which a dispersant is dissolved in such water is introduced through another feed port in FIG. 1. Then, the solutions are brought into contact with each other at a combining region 18 and in the microchannel 16, thereby bringing the hydrogen ion concentration, i.e., the hydrogen ion exponent (pH) of the solution containing organic pigment, closer to neutral (pH7). Since pigment is difficult to be dissolved in an aqueous medium under a low alkaline or a low acidic condition, fine particles of the pigment are deposited as the hydrogen ion exponent (pH) of the solution containing the organic pigment approaches neutral, and the deposited fine particles are delivered through a discharge port of the microchannel 16.

The change in the hydrogen ion exponent (pH) when producing pigment fine particles from a pigment dissolved in an alkaline aqueous medium is generally within pH 16.0 to 5.0, preferably within pH 16.0 to 10.0. The change in the hydrogen ion exponent (pH) when producing pigment fine particles from a pigment dissolved in an acidic aqueous medium is generally within pH 1.5 to 9.0, preferably within pH 1.5 to 4.0. While the range of the change depends on the hydrogen ion exponent (pH) of the organic pigment solution, a range sufficient for allowing the organic pigment to deposit may be used.

The dispersant added to the solution is now described. In the method of producing organic pigment fine particles of the present invention, a dispersant may be added to an organic pigment solution B containing an organic pigment and/or a pH adjustor solution A for changing the hydrogen ion exponent (pH). The dispersant rapidly adsorbs to the surface of deposited pigment to form fine pigment particles and has a function to prevent the fine particles from coagulating. In the present invention, for such a dispersant, an anionic, cationic, amphoteric, nonionic or pigment-type low molecular weight or high molecular weight dispersant may be used. These dispersants may be used alone or in combination. The dispersant used for dispersing a pigment is described in detail in "Stabilization of Pigment Dispersion and Surface Treatment Technique/Evaluation" (Japan Association for International Chemical Information, December, 2001) pp. 29 to 46.

Examples of anionic dispersants (anionic surfactants) include N-acyl-N-alkyltaurine salts, fatty acid salts, alkylsulfates, alkylbenzenesulfonates, alkylnaphthalenesulfonates, dialkylsulfosuccinates, alkylphosphates, naphthalenesulfonic acid formalin condensates and polyoxyethylene alkylsulfates. Of these, N-acyl-N-alkyltaurine salts are preferred. N-acyl-N-alkyltaurine salts described in Japanese Patent Application Laid-Open No. 3-273067 are preferred. These anionic dispersants may be used alone or in combination of two or more.

Examples of cationic dispersants (cationic surfactants) include quaternary ammonium salts, alkoxylated polyamines, aliphatic amine polyglycol ethers, aliphatic amines, diamines and polyamines derived from aliphatic amine and aliphatic alcohol, imidazoline derived from fatty acid, and salts of these cationic substances. These cationic dispersants may be used alone or in combination of two or more.

An amphoteric dispersant has in its molecule both an anionic group moiety which the aforementioned anionic dispersant has in its molecule and a cationic group moiety which the aforementioned cationic dispersant has in its molecule.

Examples of nonionic dispersants (nonionic surfactants) include polyoxyethylene alkyl ethers, polyoxyethylene alkylaryl ethers, polyoxyethylene fatty acid esters, sorbitan fatty acid esters, polyoxyethylene sorbitan fatty acid esters, polyoxyethylene alkylamines and glycerol fatty acid esters. Of these, polyoxyethylene alkylaryl ethers are preferred. These nonionic dispersants may be used alone or in combination of two or more.

A pigment dispersant is defined as a dispersant derived from an organic pigment as a parent material, which is produced by chemical modification of the parent structure. Examples thereof include sugar-containing pigment dispersants, piperidyl-containing pigment dispersants, pigment dispersants derived from naphthalene or perylene, pigment dispersants containing a functional group linked to a pigment parent structure through a methylene group, pigment dispersants containing a pigment parent structure chemically modified by polymer, pigment dispersants containing a sulfonic group, pigment dispersants containing a sulfonamide group, pigment dispersants containing an ether group, and pigment dispersants containing a carboxylic acid group, a carboxylic acid ester group or a carboxamide group.

Specific examples of high molecular weight dispersants include polyvinylpyrrolidone, polyvinyl alcohol, polyvinyl methyl ether, polyethylene oxide, polyethylene glycol, polypropylene glycol, polyacrylamide, vinyl alcohol-vinyl acetate copolymers, partially formalized polyvinyl alcohol, partially butyralized polyvinyl alcohol, vinylpyrrolidone-vinyl acetate copolymers, polyethylene oxide/propylene oxide block copolymers, polyacrylic acid salts, polyvinylsulfuric acid salts, poly(4-vinylpiridine) salts, polyamides, polyallylamine salts, condensed naphthalenesulfonic acid salts, styrene-acrylic acid salt copolymers, styrene-methacrylic acid salt copolymers, acrylic ester-acrylic acid salt copolymers, acrylic ester-methacrylic acid salt copolymers, methacrylic ester-acrylic acid salt copolymers, methacrylic ester-methacrylic acid salt copolymers, styrene-itaconic acid salt copolymers, itaconic acid ester-itaconic acid salt copolymers, vinylnaphthalene-acrylic acid salt copolymers, vinylnaphthalene-methacrylic acid salt copolymers, vinylnaphthalene-itaconic acid salt copolymers, cellulose derivatives and starch derivatives. In addition, natural polymers such as alginate, gelatin, albumin, casein, gum arabic, tragacanth gum and ligninsulfonic acid salts may also be used. Of these, polyvinylpyrrolidone is preferred. These polymers may be used alone or in combination of two or more.

The amount of dispersant to be added is preferably 0.1 to 1000 parts by mass, more preferably 1 to 500 parts by mass, further preferably 10 to 250 parts by mass based on 100 parts by mass of the pigment to further improve the uniform dispersibility and the storage stability of the pigment. When the amount is less than 0.1 parts by mass, the dispersion stability of organic pigment fine particles may not be improved.

The method of measuring the particle size of the produced organic pigment fine particles is now described. In the methods of measuring fine particles, there are approaches to express an average size in a group of particles in numerical values. Typically used are mode diameters which show the maximum value in a particle size distribution, median diameters which correspond to the central value in an integral distribution curve and various average diameters (length average, area average, weight average). The particle size of the organic pigment fine particles produced by the method of the present invention is optional as long as the microchannel 16 is not blocked. The organic pigment fine particles have a mode diameter of preferably 1 μm or less, more preferably 3 nm to 800 nm, particularly preferably 5 nm to 500 nm.

The size and size distribution of the produced organic pigment fine particles are now described.

Uniformity in particle size of fine particles, i.e., monodispersibility of fine particles, means that not only the contained particles have a uniform size but also there is no variation in the chemical composition and the crystal structure of the particles, and so such uniformity is an important factor for determining ability of particles. In particular, such monodispersibility is considered an important factor for controlling properties of fine particles with a particle size of a nanometer level. The method of the present invention is excellent in that not only it can control particle size but also it can make the particle size uniform. As an index of uniformity in particle size, arithmetic standard deviation is used. The organic pigment fine particles produced by the present invention have an arithmetic standard deviation of preferably 130 nm or less, particularly preferably 80 nm or less. The arithmetic standard deviation is an approach to calculate the standard deviation assuming a particle size distribution to be a normal distribution, and is obtained by subtracting the 16% particle size from the 84% particle size in the integrated distribution, and dividing the difference by 2.

EXAMPLES

The present invention will be described in more detail with reference to the following Examples, but these Examples are not intended to limit the present invention in any way.

Example 1

In Example 1, organic pigment fine particles of Pigment Red 122 (C. I. No. 73915) were produced.

A pH was measured by pH meter F-54 (measurement range pH 0 to 14) from HORIBA, Ltd. A particle size distribution of the produced organic pigment fine particles was measured by Nanotrac UPA-EX 150 from NIKKISO CO., LTD.

An organic pigment solution B and a pH adjustor solution A were prepared as follows:

(1) Organic pigment solution B
  2,9-Dimethylquinacridone . . . 7.5 g
  Dispersant polyvinylpyrrolidone (from Wako Pure Chemical Industries, Ltd., K30) . . . 37.5 g
  Aqueous solution of 0.8 M potassium hydroxide . . . 83 mL
  Dimethylsulfoxide (DMSO) . . . 568 mL
  The above components were sufficiently mixed under stirring and dissolved completely at room temperature. Then, this solution was passed through a 0.45 μm microfilter to remove impurities such as debris. The pH of the organic pigment solution thus prepared exceeded the measurement limit (pH 14), and therefore unmeasurable.

(2) pH adjustor solution A
  Dispersant oleylmethyl taurine sodium salt . . . 75 g
  Distilled water . . . 9,000 g
  The above components were sufficiently mixed under stirring and dissolved completely at room temperature. Then, this solution was passed through a 0.45 μm microfilter to remove impurities such as debris. The pH of the pH adjustor solution A thus prepared was 7.7.

(3) A three-dimensional microreactor shown in FIG. 4, which has the following number of division (number of channels) was used as a microreactor.
  i) Number of supply channels (n). The organic pigment solution B was divided into 5, and the pH adjustor solution A was divided into 5.
  ii) Width of supply channels 12, 14 (W) . . . 100 μm each
  iii) Height of supply channels 12, 14 (H) . . . 100 μm each
  iv) Diameter of a combining region 18 (D) . . . 320 μm
  v) Diameter of a microchannel 16(R) . . . 360 μm
  vi) Inlet and outlet areas . . . The total inlet area (S1) was 0.1 mm$^2$ and the outlet area (S2) was 0.1 mm$^2$ so that they were the same.
  vii) Intersection angle of the central axes between each of supply channels 12, 14 and a microchannel 16 at a combining region 18 . . . 90°
  viii) Material for a microreactor . . . Stainless (SUS304)
  ix) Channel processing method . . . Performed by microelectric discharge machining, and 3 parts: a supply block 32, a combining block 34, and a reaction block 36 were sealed by metal surface sealing with metal grinding.

(4) Reaction conditions
  i) Predetermined flow rate . . . Using a syringe pump (from Harvard Co.), the organic pigment solution B and the pH adjustor solution A were supplied at constant flow rates 2.867 mL/minute and 17.146 mL/minute, respectively. The flow rate of a dispersion of organic pigment fine particles flowing in a microchannel 16 was about 20 mL/minute, and a flow rate ratio between the organic pigment solution B and the pH adjustor solution A was 1:6.
  ii) Average flow rate of solutions A, B . . . UBin was 0.956 m/second, UAin was 5.715 m/second, and Uout was 3.275 m/second.
  iii) Shear rate . . . Shear rate in a microchannel 16 (U/R)=9.0×10$^3$
  iv) Reaction temperature . . . 10° C.

Figure 7:
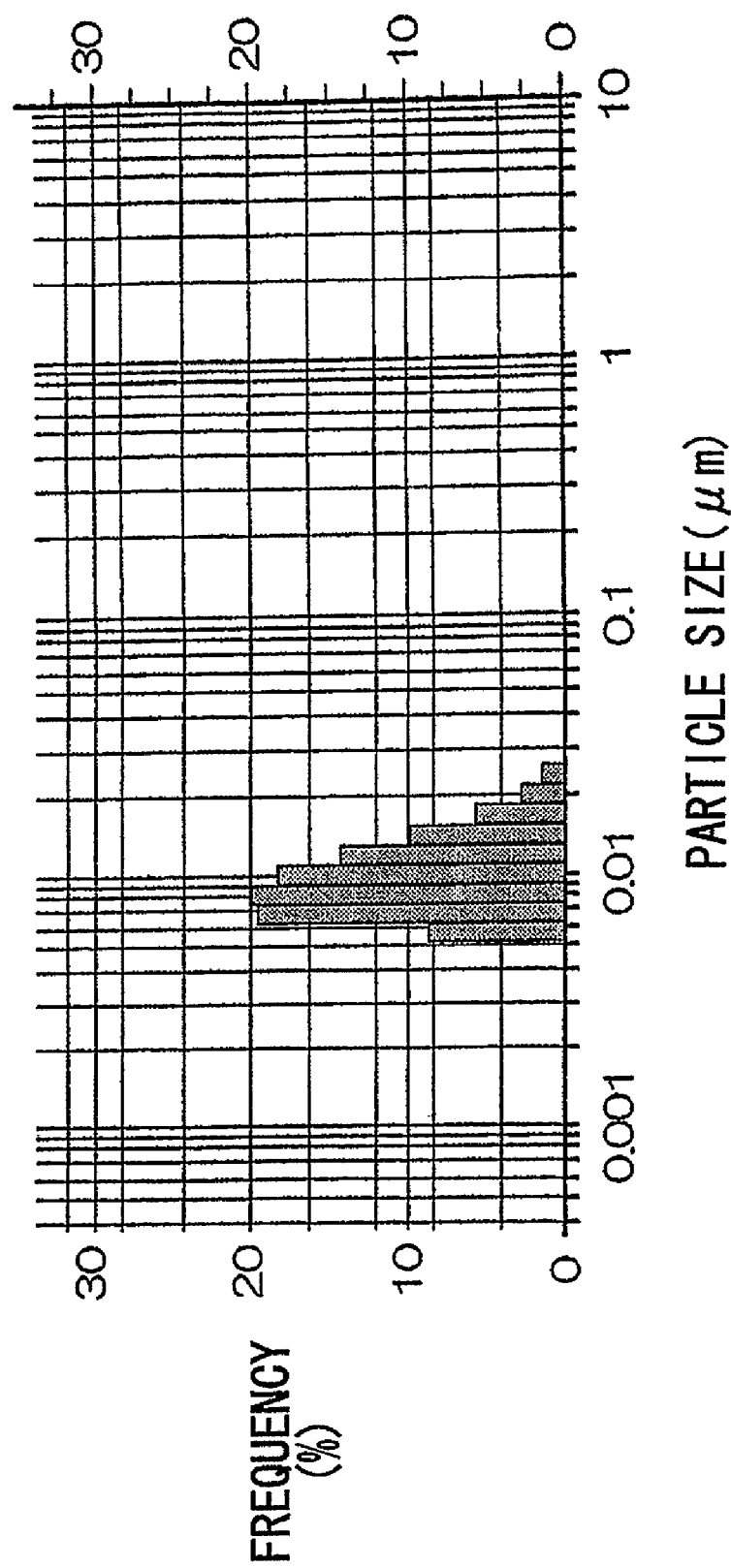
FIG. 7 is a graph showing the results of Example 1.

(5) Production results
  i) Particle size and particle size distribution results
  The median average size M 50% of organic pigment fine particles produced in Example 1 under the aforementioned conditions was 9.2 nm (volume average size Mv=10.1 nm, number average size Mn=7.8 nm), and the arithmetic standard deviation STD was 3.3 nm (see FIG. 7). As appreciated from the above results, organic pigment fine particles in a nanometer size, excellent in monodispersibility could be stably produced in Example 1.

Moreover, stable continuous production was able to be performed without causing blocking during production. In the case of calculation based on operation of 6,000 hours per year, one microreactor produces 7.2 tons/year, which is a high throughput usable in real production. Pressure loss through a microreactor is 0.16 MPa, and therefore operation with low pressure loss can be performed. Desired organic pigment fine particles could be obtained with low power.

Comparative Example 1

Organic pigment fine particles were produced using solutions A, B the same as those in Example 1 as well as a 50 mL small-size container with stirrer (in a form of tank).

(1) Reaction Conditions
  The aforementioned small-size container was immersed into a thermostat tank kept the temperature at 10° C. To the container, 6 mL of a pH adjustor solution was added, and the mixture was stirred at a revolving speed of 500 rpm. During the stirring, 1 mL of an organic pigment solution was added from the liquid surface at an addition speed of 1 mL/minute using a syringe pump (from Harvard Co.).

(2) Production Results
  i) Particle Size and Particle Size Distribution Results
  The median average size M 50% of the organic pigment fine particles produced in Comparative Example 1 under the aforementioned conditions was 14.1 nm (volume average size Mv=16.9 nm, number average size Mn=10.5 nm), and the arithmetic standard deviation STD was 7.7 nm, which results were worse than those of Example 1.

Example 2

In Example 2, organic pigment fine particles of Pigment Yellow 128 (C. I. No. 20037) were produced.

The particle size distribution of Example 2 was measured by a dynamic light scattering particle size distribution meter (LB-550) from HORIBA, Ltd.

(1) Organic pigment solution B
  Pigment (P. Y. 128). 1.25 g
  Dispersant polyvinylpyrrolidone (from Wako Pure Chemical Industries, Ltd., K30) . . . 1.25 g
  Aqueous solution of 1 M potassium hydroxide . . . 6.0 mL
  Dimethylsulfoxide (DMSO) . . . 82 mL The above components were sufficiently mixed under stirring and dissolved completely at room temperature. This solution was clear and yellow-brown. Then, this solution was passed through a 0.45 µm microfilter to remove impurities such as debris.

(2) pH adjustor solution A
  Dispersant oleylmethyl taurine sodium salt . . . 10 g
  Distilled water . . . 990 g The above components were sufficiently mixed under stirring and dissolved completely at room temperature. Then, this solution was passed through a 0.45 µm microfilter to remove impurities such as debris.

(3) A three-dimensional microreactor shown in FIG. 4, which has the following number of division (number of channels) was used as a microreactor.

i) Number of supply channels (n) . . . The organic pigment solution B was divided into 7, and the pH adjustor solution A was divided into 7.
ii) Width of supply channels 12, 14 (W) . . . 50 µm each
iii) Height of supply channels 12, 14 (H) . . . 50 µm each
iv) Diameter of a combining region 18 (D) . . . 220 µm
v) Diameter of a microchannel 16 (R) . . . 200 µm
vi) Inlet and outlet areas . . . The total inlet area (S1) was 0.035 mm$^2$ and the outlet area (S2) was 0.031 mm$^2$ so that they were different from each other.
vii) Intersection angle of the central axes between supply channels 12, 14 and a microchannel 16 at a combining region 18 . . . 90°
viii) Material for a microreactor . . . Stainless (SUS304)
ix) Channel processing method . . . Performed by microelectric discharge machining, and 3 parts: a supply block 32, a combining block 34, and a reaction block 36 were sealed by metal surface sealing with metal grinding.

(4) Reaction conditions
i) Predetermined flow rate . . . Using a syringe pump (from Harvard Co.), the organic pigment solution B and the pH adjustor solution A were supplied at constant flow rates 3 mL/minute and 12 mL/minute, respectively. The flow rate of a dispersion of organic pigment fine particles flowing in a microchannel 16 was about 15 mL/minute, and a flow rate ratio between the organic pigment solution B and the pH adjustor solution A was 1:4.
ii) Average flow rate of solutions A, B . . . UBin was 2.857 m/second and UAin was 11.429 m/second, and Uout was 7.958 m/second.
iii) Shear rate . . . Shear rate in a microchannel (U/R)=$4.0 \times 10^4$
iv) Reaction temperature . . . 20° C.

(5) Production results
i) Particle size and particle size distribution results

The median average size M 50% of the organic pigment fine particles produced in Example 2 under the aforementioned conditions was 21.1 nm, and the arithmetic standard deviation STD was 5.5 nm. As appreciated from the above results, organic pigment fine particles in a nanometer size, excellent in monodispersibility could be stably produced in Example 2 (see FIG. 8). Moreover, stable continuous production was able to be performed without causing blocking during production.

Comparative Example 2

Organic pigment fine particles were produced using solutions A, B the same as those in Example 2 as well as a 50 mL small-size container with stirrer (in a form of tank).

(1) Reaction conditions

The aforementioned small-size container was immersed into a thermostat tank kept the temperature at 20° C. To the container, 12 mL of a pH adjustor solution A was added, and the mixture was stirred at a revolving speed of 500 rpm. During the stirring, 3 mL of an organic pigment solution B was added from the liquid surface at an addition speed of 3 mL/minute using a syringe pump (from Harvard Co.).

(2) Production results
i) Particle Size and Particle Size Distribution Results

Figure 8:
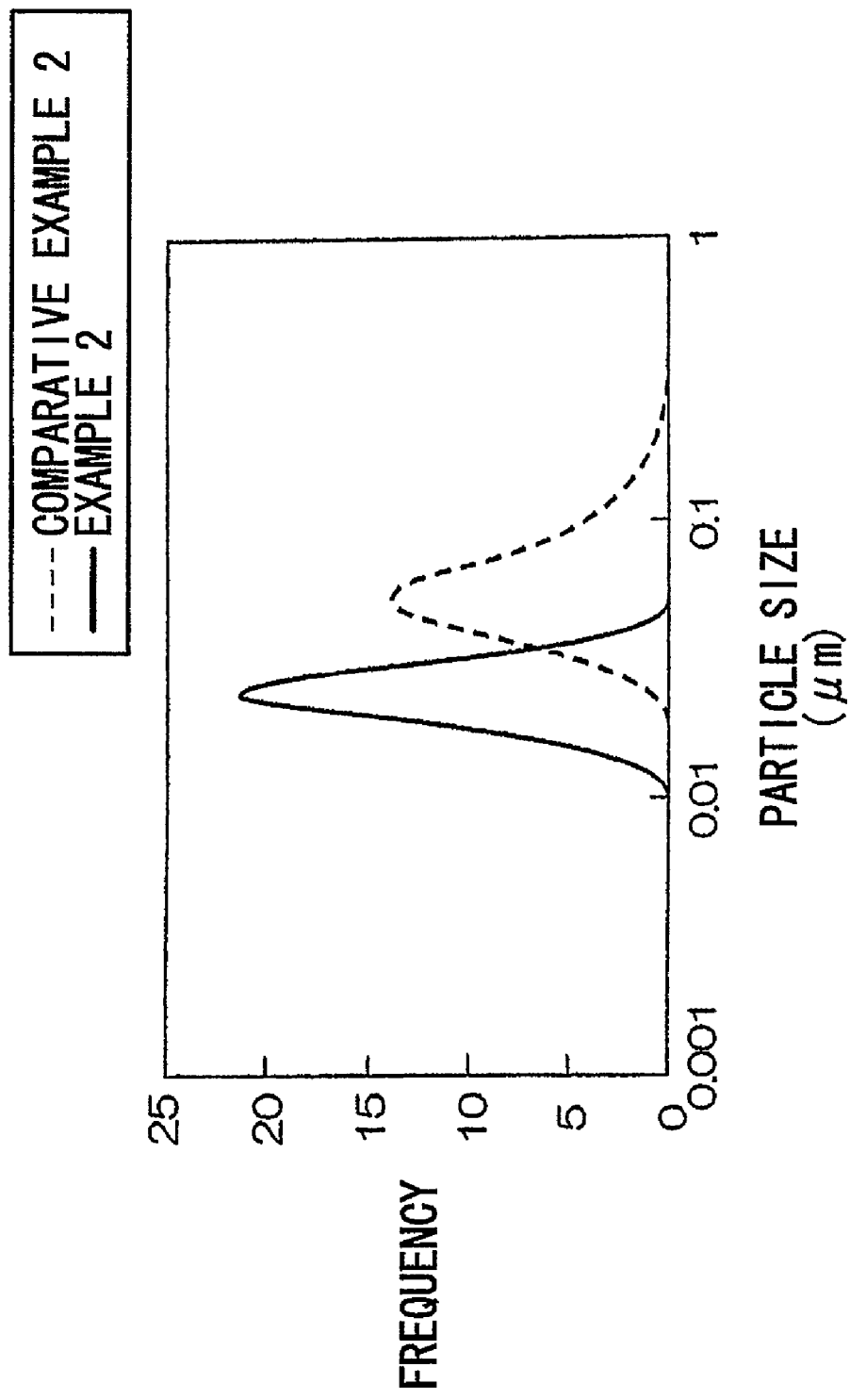
FIG. 8 is a graph comparing Example 2 and Comparative Example 2.

The median average size M 50% of the organic pigment fine particles produced in Comparative Example 1 under the aforementioned conditions was 47.4 nm, and the arithmetic standard deviation STD was 33.8 nm, which results were worse than those of Example 2 (see FIG. 8).

Example 3

In Example 3, changes of a particle size of produced organic pigment fine particles (Pigment Yellow 74 (C. I. No. 11714)) by changing a shear rate (U/R) in a microchannel 16 were tested.

The particle size distribution of Example 3 was measured by a dynamic light scattering particle size distribution meter (LB-550) from HORIBA, Ltd.

(1) Organic pigment solution B
  Pigment (P. Y. 74) . . . 1.2 g
  Dispersant polyvinylpyrrolidone (from Wako Pure Chemical Industries, Ltd., K30) . . . 6.0 g
  Aqueous solution of 1 M potassium hydroxide . . . 3.8 mL
  Dimethylsulfoxide (DMSO) . . . 109 mL The above components were sufficiently mixed under stirring and dissolved completely at room temperature. This solution was red-brown. Then, this solution was passed through a 0.45 µm microfilter to remove impurities such as debris.

(2) pH adjustor solution A
  Dispersant oleylmethyl taurine sodium salt . . . 10 g
  Distilled water . . . 990 g The above components were sufficiently mixed under stirring and dissolved completely at room temperature. Then, this solution was passed through a 0.45 µm microfilter to remove impurities such as debris.

(3) The used microreactor was the same as that of Example 2.

(4) Reaction conditions
i) Predetermined flow rate . . . Using a syringe pump (from Harvard Co.), the organic pigment solution B and the pH adjustor solution A were supplied at a constant flow rate under the shear rate conditions listed for Test 1 to Test 4 in Table 1. The flow rate ratio of a dispersion of organic pigment fine particles flowing in the microchannel 16 is 1:8.
ii) Reaction temperature . . . 20° C.

TABLE 1

| Shear rate conditions | Organic pigment solution (ml/min) | pH adjuster solution (ml/min) | Shear rate (1/second) | Median average size (nm) |
|---|---|---|---|---|
| Test 1 | 1 | 8 | $2.4 \times 10^4$ | 84.3 |
| Test 2 | 2 | 16 | $4.8 \times 10^4$ | 64.7 |
| Test 3 | 3 | 24 | $7.2 \times 10^4$ | 61.1 |
| Test 4 | 4 | 32 | $9.5 \times 10^4$ | 53.6 |

(5) Test results

Figure 9:
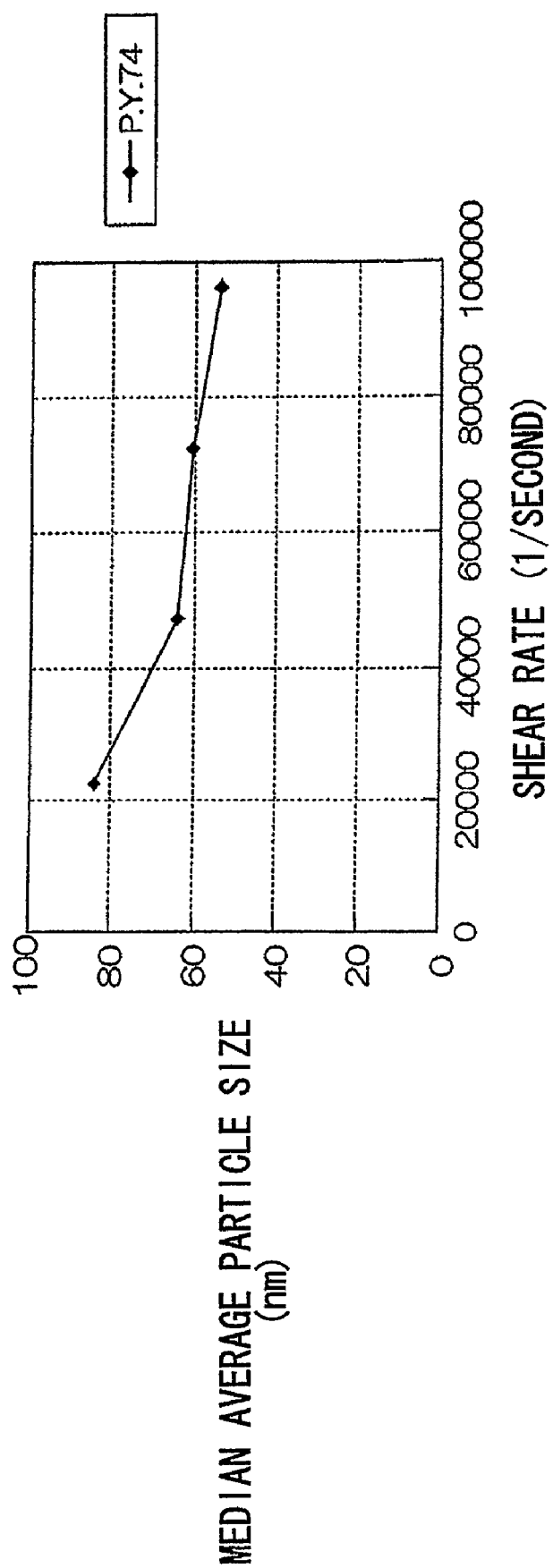
FIG. 9 is an explanatory view showing the relation between the shear rate in the microchannel and the particle size of organic pigment fine particles produced in Example 3.

The test results are shown in Table 1 and FIG. 9. As appreciated from Table 1 and FIG. 9, as the shear rate in the microchannel 16 becomes higher, the median average size of the produced organic pigment fine particles gradually become smaller. This means that the particle size of the organic pigment fine particle to be produced can be controlled by changing the shear rate in the microchannel 16.

The invention claimed is:

1. A method of producing organic pigment fine particles, comprising:
    allowing two or more solutions at least one of which is an organic pigment solution in which an organic pigment is dissolved to flow through a microchannel in a non-laminar state; and
    depositing organic pigment fine particles from the organic pigment solution in a course of flowing;
    wherein the organic pigment is flowed through a first channel joining a mixing channel, and a second channel joins with the mixing channel, said second channel flowing a second one of the two or more solutions, which is not the organic pigment solution, wherein the first and second channels intersect the mixing channel at angles a, β, respectively, such that S1>S2 is satisfied, wherein S1 is a sum of cross-sectional areas in a thickness direction of the first and second channels at the intersection of the mixing channel, and S2 is a cross-sectional area of the mixing channel.

2. The method of producing the organic pigment fine particles according to claim 1, wherein
    the organic pigment solution is a solution in which an organic pigment is dissolved in an alkaline or acidic aqueous medium, and
    the organic pigment fine particles are deposited by changing a hydrogen ion exponent (pH) of the organic pigment solution in the course of flowing through the microchannel.

3. The method of producing organic pigment fine particles according to claim 1, wherein the microchannel has a characteristic length in an equivalent diameter of 1 μm to 1000 μm.

4. The method of producing organic pigment fine particles according to claim 1, further comprising changing a shear rate (1/second) represented by U/R, wherein the equivalent diameter of the microchannel is described as R(m) and a mean velocity of a solution flowing through the microchannel is described as U (m/second).

5. The method of producing organic pigment fine particles according to claim 4, wherein the shear rate (U/R) is adjusted to 100 (1/second) or more.

6. The method of producing organic pigment fine particles according to claim 2, wherein the organic pigment solution is alkaline.

7. The method of producing organic pigment fine particles according to claim 1, wherein the organic pigment solution is a homogeneous solution in which an organic pigment is dissolved in an aqueous organic solvent.

8. The method of producing organic pigment fine particles according to claim 1, wherein the organic pigment solution contains a dispersant.

9. The method of producing organic pigment fine particles according to claim 8, wherein at least one dispersant is a low molecular weight dispersant.

10. The method of producing organic pigment fine particles according to claim 1, wherein the organic pigment fine particles are obtained as a dispersion thereof.

* * * * *